(12) United States Patent
Decker et al.

(10) Patent No.: US 10,487,009 B2
(45) Date of Patent: Nov. 26, 2019

(54) ARTICLES HAVING RETAINED STRENGTH

(71) Applicant: CORNING INCORPORATED, Corning, NY (US)

(72) Inventors: Heather Bossard Decker, Arkport, NY (US); Shandon Dee Hart, Corning, NY (US); Guangli Hu, Horseheads, NY (US); Fei Li, Painted Post, NY (US); James Joseph Price, Corning, NY (US); Chandan Kumar Saha, Franklin, MI (US)

(73) Assignee: Corning Incorporated, Corning, NY (US)

( * ) Notice: Subject to any disclaimer, the term of this patent is extended or adjusted under 35 U.S.C. 154(b) by 462 days.

(21) Appl. No.: 14/052,055

(22) Filed: Oct. 11, 2013

(65) Prior Publication Data

US 2014/0106146 A1 Apr. 17, 2014

Related U.S. Application Data

(60) Provisional application No. 61/820,395, filed on May 7, 2013, provisional application No. 61/712,908, filed on Oct. 12, 2012.

(51) Int. Cl.
*C03C 17/34* (2006.01)
*C03C 17/36* (2006.01)
(Continued)

(52) U.S. Cl.
CPC .......... *C03C 17/34* (2013.01); *C03C 17/3417* (2013.01); *C03C 17/3435* (2013.01);
(Continued)

(58) Field of Classification Search
CPC ..... C03C 17/34; C03C 17/3435; C03C 17/36; C03C 17/42; G06F 3/03;
(Continued)

(56) References Cited

U.S. PATENT DOCUMENTS 4,526,818 A * 7/1985 Hoshikawa ....... G02F 1/133305
156/106
4,571,446 A 2/1986 Shunpei ........................ 136/244
(Continued)

FOREIGN PATENT DOCUMENTS

CN 201369036 Y 12/2009 ............... 3/44
CN 201465083 U 5/2010 ............... 3/44
(Continued)

OTHER PUBLICATIONS

Chen et al, "Thermal effects of various conductive thin films deposited on flexible substrates" pp. 427-431 of Manufacturing and Engineering Technology; Retrieved Mar. 30, 2016.*
(Continued)

*Primary Examiner* — Frank J Vineis
*Assistant Examiner* — Laura B Figg

(57) ABSTRACT

One or more aspects of the disclosure pertain to an article including a film disposed on a glass substrate, which may be strengthened, where the interface between the film and the glass substrate is modified, such that the article retains its average flexural strength, and the film retains key functional properties for its application. Some key functional properties of the film include optical, electrical and/or mechanical properties. The bridging of a crack from one of the film or the glass substrate into the other of the film or the glass substrate can be prevented by inserting a crack mitigating layer between the glass substrate and the film.

14 Claims, 9 Drawing Sheets

(51) Int. Cl.
  *C03C 17/38* (2006.01)
  *G06F 3/03* (2006.01)
  *C03C 17/42* (2006.01)
  *C03C 21/00* (2006.01)

(52) U.S. Cl.
  CPC .............. *C03C 17/36* (2013.01); *C03C 17/38* (2013.01); *C03C 17/42* (2013.01); *C03C 21/002* (2013.01); *G06F 3/03* (2013.01); *C03C 2217/425* (2013.01); *C03C 2217/948* (2013.01); *Y10T 428/2495* (2015.01); *Y10T 428/24851* (2015.01); *Y10T 428/24926* (2015.01); *Y10T 428/24975* (2015.01); *Y10T 428/24983* (2015.01); *Y10T 428/24996* (2015.04); *Y10T 428/24999* (2015.04)

(58) Field of Classification Search
  CPC ..... Y10T 428/24851; Y10T 428/24926; Y10T 428/2495; Y10T 428/24975; Y10T 428/24983
  USPC .......................................................... 428/216
  See application file for complete search history.

(56) References Cited

U.S. PATENT DOCUMENTS

| | | | |
|---|---|---|---|
| 4,835,061 A | 5/1989 | Ohta et al. | 428/469 |
| 4,935,296 A | 6/1990 | Stevens | 428/288 |
| 4,995,684 A | 2/1991 | Tustison et al. | 350/1.6 |
| 5,109,292 A * | 4/1992 | Yamazaki | G02F 1/133345 349/122 |
| 5,190,824 A | 3/1993 | Itoh | 428/408 |
| 5,325,219 A | 6/1994 | Hanyu et al. | |
| 6,057,007 A * | 5/2000 | Amano | C09K 19/0266 252/299.61 |
| 6,092,392 A | 7/2000 | Verlinden et al. | |
| 6,392,735 B1 | 5/2002 | Tani | 349/156 |
| 6,617,056 B1 | 9/2003 | Hara et al. | 428/697 |
| 6,707,610 B1 | 3/2004 | Woodard et al. | 349/582 |
| 6,815,070 B1 | 11/2004 | Burkle et al. | 428/425.6 |
| 7,186,465 B2 | 3/2007 | Bright | 428/689 |
| 7,763,151 B2 | 7/2010 | Noguchi et al. | 204/192.29 |
| 8,081,169 B2 | 12/2011 | Lin et al. | 345/173 |
| 2003/0006704 A1 | 1/2003 | Morimoto et al. | 313/582 |
| 2004/0071960 A1 | 4/2004 | Weber et al. | |
| 2004/0115416 A1 | 6/2004 | Nonninger et al. | |
| 2008/0085401 A1 * | 4/2008 | Garner | H01L 51/0097 428/192 |
| 2009/0159417 A1 | 6/2009 | Lin et al. | 200/600 |
| 2010/0047521 A1 * | 2/2010 | Amin | C03C 3/083 428/141 |
| 2010/0147578 A1 * | 6/2010 | Matsumura | B32B 27/08 174/388 |
| 2011/0165393 A1 * | 7/2011 | Bayne | C03C 15/02 428/215 |
| 2011/0201490 A1 * | 8/2011 | Barefoot | C03B 33/0222 501/66 |
| 2011/0216020 A1 | 9/2011 | Lee et al. | 345/173 |
| 2011/0236604 A1 | 9/2011 | Fujiwara et al. | |
| 2012/0196103 A1 * | 8/2012 | Murashige | C03C 17/32 428/213 |
| 2012/0223912 A1 | 9/2012 | Kim | 345/174 |
| 2012/0327568 A1 | 12/2012 | Shedletsky et al. | 361/679.01 |
| 2013/0127202 A1 | 5/2013 | Hart | |
| 2013/0169590 A1 | 7/2013 | Wickboldt et al. | 345/174 |
| 2013/0170224 A1 * | 7/2013 | Huang | H01L 51/5262 362/311.02 |

FOREIGN PATENT DOCUMENTS

| | | | | |
|---|---|---|---|---|
| CN | 20281995 U | 6/2012 | | |
| EP | 2273476 A1 | 1/2011 | | 9/30 |
| EP | 2492250 A1 | 8/2012 | | 17/32 |
| JP | 2007231224 A | 9/2007 | | 73/10 |
| JP | WO2011048861 A1 * | 4/2011 | | |
| JP | 2012031018 A | 2/2012 | | |
| JP | 201304989 A | 5/2013 | | 1/11 |
| KR | 20100125435 A | 11/2010 | | |
| KR | 2013081567 A | 7/2013 | | 9/6 |
| WO | 2010074748 A1 | 7/2010 | | B32B 17/10 |
| WO | 2013084900 | 6/2013 | | 1/11 |

OTHER PUBLICATIONS

Patent Cooperation Treaty International Notification of Transmittal of the International Search Report and The Written Opinion of the International Searching Authority, international application No. PCT/US2013/064522; dated Feb. 3, 2014, 10 pages.

Chi, Shyang-ho. "Cracking in coating—substrate composites with multi-layered and FGM coatings." Engineering Fracture Mechanics 70 (2003) 1227-1243.

Giannelis, Emmanuel. "Polymer Layered Silicate Nanocomposites." Adv. Mater. 1996, 8, No. 1, pp. 29-35.

Phillip Jannotti, Ghatu Subhas, and Arun K. Varshneya. "Ball Impact Response of Unstrengthened and Chemically Strengthened Glass Bars." Journal of Am. Ceram. Soc., 1-9 (2013).

Roberto Dugnani and Ricardo Zednik. "Flexural Strength by Fractography in Modern Brittle Materials." J.Am. Ceram. Soc. 96 (12) 3908-3914 (2013).

Hongyu Quan, Baixiong Zhao, Xinhua Liao, Qiang Mei. "Restraint of stress in fabricating the large areas of crack-free porous silica films in the presences of composite polydimethylsiloxane." Journal of Sol-Gel Sci & Tech. Nov. 2013.

Zhiguo Meng, Huajun Peng, Chunya Wu, Chengfeng Qiu, Kuen Kuen Li, Man Wong, Hoi Sing Kwok: "Room-temperature deposition of thin-film indium tin oxide on micro-fabricated color filters and its application to flat-panel displays." J. of the SID, Dec. 1, 2014, pp. 113-118.

Cheng Peng, Zheng Jia, Henry Neilson, Teng Li and Jun Lou, "In Situ Electro-Mechanical Experiments and Mechanics Modeling of Fracture in Indium Tin Oxide-Based Multilayer Electrodes." Adv. Eng. Mat., p. 1-7, 2012.

Ting Y. Tsui, Andrew J. McKerrow, Joost J. Vlassak. "Constraint effects on thin film channel cracking behaviour." J. Mater. Res., vol. 20, No. 9, Sep. 2005.

"Standard Test Method for Total Mass Loss and Collected Volatile Condensable Materials from Outgassing in a Vacuum Environment," ASTM International. Designation: E595-07.

Myeon-Cheon Choi, Youngkyoo Kim, Chang-Sik Ha "Polymers for flexible displays: From material selection to device applications." Progress in Polymer Science. vol. 33, Issue 6, Jun. 2008, pp. 581-630.

Cotterell et al; "Buckling and Cracking of Thin Films on Compliant Substrates Under Compression"; International Jounral of Fracture, 2000. 104(2): p. 169-179.

He et al; "Crack Deflection at an Interface Between Dissimilar Elastic Materials"; International Journal of Solids and Structures, 1989. 25(9): p. 1053-1067.

Houng et al; "Characterization of Indium Tin Oxide Films by RF-Assisted DC Magnetron Sputtering," Applied Surface Science, 258, 15, p. 5593, 2012.

Jiao et al; "Alignment Layer Effects on Thin Liquid Crystal Cells," Appl. Phys. Lett. 92, 061102, 2008.

Kim et al; "Effect of the Surface Anisotropy of a Rubbed Polyimide Film on Liquid Crystal Alignment Properties," (LG Display), SID 09 Digest, P-195L, 2009 pp. 1641-1643.

Li et al; "Preparation and Properties of a High Temperature, Flexible and Colorless ITO Coated Polyimide Substrate", European Polymer Jounral, 43, p. 3368, 2007.

Lim et al; "Flexible Organic Electroluminescent Devices Based on Fluorine-Containing Colorless Polyimide Substrates", Advanced Materials, 14, 18, p. 1275, 2002.

Lin et al; "Low Temperature ITO Thin Film Deposition on PES Substrate Using Pulse Magnetron Sputtering," Applied Surface Science, 254, 11, p. 3262, 2008.

(56) References Cited

OTHER PUBLICATIONS

Yang et al; "Electrical and Optical Properties of Indium Tin Oxide Films Prepared on Plastic Substrates by Radio Frequency Magnetron Sputtering," Thin Solid Films, 516, p. 1984, 2008.
Zeng et al; "Investigation of Mechanical Properties of Transparent Conducting Oxide Thin Films"; Thin Solid Films, 2003. 443(1-2): p. 60-65.
TW102136791 Search Report dated Dec. 5, 2016, Taiwan Patent Office.
English Translation of CN201380064857.3 Notice of First Office Action dated Nov. 9, 2016; 7 Pages; Chinese Patent Office.
English Translation of JP2015536929 Office Action dated Aug. 8, 2017, Japan Patent Office.
KR20157012302 Notice of Allowance dated Nov. 14, 2018, 3 Pages; Korean Patent Office.

* cited by examiner

ARTICLES HAVING RETAINED STRENGTH

CROSS-REFERENCE TO RELATED APPLICATIONS

This application claims the benefit of priority under 35 U.S.C. § 119 of U.S. Provisional Application Ser. No. 61/712,908 filed on Oct. 12, 2012, and the benefit of priority under 35 U.S.C. § 119 of U.S. Provisional Application Ser. No. 61/820,395 filed on May 7, 2013, the contents of which are relied upon and incorporated herein by reference in their entireties.

BACKGROUND

This disclosure relates to articles including a glass substrate that has a film disposed on its surface, and a modified interface between the film and the glass substrate such that the glass substrate and/or the article substantially retains its average flexural strength, and the film retains key properties for its application.

Articles including a glass substrate, which may be strengthened or strong as described herein, have found wide usage recently as a protective cover glass for displays, especially in touch-screen applications, and there is a potential for its use in many other applications, such as automotive or architectural windows and glass for photovoltaic systems. In many of these applications it can be advantageous to apply a film to the glass substrates. Exemplary films include indium-tin-oxide ("ITO") or other transparent conductive oxides (e.g., aluminum and gallium doped zinc oxides and fluorine doped tin oxide), hard films of various kinds (e.g., diamond-like carbon, $Al_2O_3$, AlN, AlOxNy, $Si_3N_4$, $SiO_xN_y$, $SiAl_xO_yN_zTN$, TiC), IR or UV reflecting layers, conducting or semiconducting layers, electronics layers, thin-film-transistor layers, or anti-reflection ("AR") films (e.g., $SiO_2$, $Nb_2O_5$ and $TiO_2$ layered structures). In many instances these films must necessarily be hard and brittle, or otherwise their other functional properties (e.g., mechanical, durability, electrical conductivity, optical properties) will be degraded. In most cases these films are thin films, that is, they generally have a thickness in the range of 0.005 µm to 10 µm (e.g., 5 nm to 10,000 nm).

When a film, as defined herein, is applied to a surface of a glass substrate, which may be strengthened or characterized as strong, the average flexural strength of the glass substrate may be reduced, for example, when evaluated using ball-drop or ring-on-ring strength testing. This behavior has been measured to be independent of temperature effects (i.e., the behavior is not caused by significant or measureable relaxation of surface compressive stress in the strengthened glass substrate due to any heating). The reduction in average flexural strength is also apparently independent of any glass surface damage or corrosion from processing, and is apparently an inherent mechanical attribute of the article, even when thin films having a thickness in the range from about 20 nm to about 200 nm are utilized in the article. In view of this new understanding, there is a need to prevent films from reducing the average flexural strength of glass substrates and articles including the same.

SUMMARY

A first aspect of this disclosure pertains to articles that can be utilized in touch-sensing devices, information display devices and other such devices. The articles include a film disposed on a glass substrate, where the interface between the film and the glass substrate is modified, such that the article retains the average flexural surface strength of a similar or same glass substrate without the film, and the film retains key functional properties (e.g., optical, electrical and mechanical properties) for its application. In one or more embodiments, the interfacial properties between the film and the glass substrate are modified to prevent a crack from bridging from one of the film or the glass substrate into the other of the film or the glass substrate.

In one or more embodiments, the articles include a crack mitigating layer disposed between the film and the glass substrate, which prevents cracks originating in one of the film and the glass substrate from bridging into the other of the film and the glass substrate. In one or more specific embodiments, the crack mitigating layer increases the average flexural strength of the article, when compared to articles that do not include a crack mitigating layer. In one or more alternative embodiments, the crack mitigating layer increases the average strain-to-failure of the article, when compared to an article that includes the glass substrate and film but does not include a crack mitigating layer. In other words, the article including a crack mitigating layer exhibits a greater average strain-to-failure than articles with the glass substrate and film but without a crack mitigating layer.

An article according to one or more embodiments has a total reflectivity of 6.0% or less over the visible wavelength range from about 450 nm to about 650 nm. The article may further exhibit functional properties, such as optical properties, electrical properties and mechanical properties, which are improved over articles that include the glass substrate and film but do not include a crack mitigating layer. In one or more embodiments, the article may exhibit improved optical properties and electrical properties over articles with the glass substrate and film but without a crack mitigating layer. In a more specific embodiment, the article may exhibit improved optical properties and mechanical properties over articles with the glass substrate and film but without a crack mitigating layer. In an even more specific embodiment, the article may exhibit improved electrical properties and mechanical properties over articles with the glass substrate and film but without a crack mitigating layer. The article may exhibit improved electrical properties, optical properties and mechanical properties over articles with the glass substrate and film but without a crack mitigating layer.

Articles in accordance with one or more embodiments may exhibit greater average flexural strength and lower average reflectance over a wavelength range from 450-650 nm than articles that include a glass substrate and film but do not include a crack mitigating layer.

The glass substrate utilized in one or more embodiments of the article may be strengthened or strong, as described herein. In one or more embodiments, the glass substrate may be chemically strengthened and may have a surface compressive stress greater than about 500 MPa and a compressive depth-of-layer greater than about 15 µm. The glass substrate may have a toughness that is greater than the toughness of the interface between the glass substrate and the film. For example, the crack mitigating layer may form a low-adhesion layer or interface between the glass substrate and the film that has a fracture toughness less than about 0.5 times or less than about 0.25 times the toughness of the glass substrate and/or the toughness of the film. In one or more embodiments, the glass substrate has an average strain-to-failure that is greater than about 0.5%, 0.7%, 1.0%, 1.5% or 2%.

The glass substrate of one or more embodiments has a refractive index that is less than the refractive index of the crack mitigating layer and the film. In one or more specific embodiments, the film may have a refractive index that is greater than the refractive index of the crack mitigating layer. In such embodiments, the refractive index of the crack mitigating layer is between the refractive indices of the film and the glass substrate.

The film according to one or more embodiments may exhibit a modulus of about 25 GPa or more and/or a hardness of about 1.75 GPa or more. The film may have a fracture toughness of less than about 10 MPa·m$^{1/2}$. In one or more embodiments, the film has an average strain-to-failure that is less than the average strain-to-failure of the crack mitigating layer and the glass substrate. The film may include one or more layers such as transparent conductive oxide layers, IR reflecting layers, UV reflecting layers, conducting layers, semiconducting layers, electronics layers, thin film transistor layers, EMI shielding layers, anti-reflection layers, anti-glare layers, dirt-resistant layers, self-cleaning layers, scratch-resistant layers, barrier layers, passivation layers, hermetic layers, diffusion-blocking layers, fingerprint-resistant layers and combinations thereof. Exemplary transparent conductive oxide layers may include indium-tin-oxide.

In one or more embodiments, the crack mitigating layer may have a critical strain energy release rate ($G_{IC}=K_{IC}^2/E$) that is greater than the critical strain energy release rate ($G_{IC}=K_{IC}^2/E$) of the film. In specific embodiments, the crack mitigating layer has a critical strain energy release rate of 0.1 kJ/m$^2$ or greater, while the film has a critical strain energy release rate of less than 0.1 kJ/m$^2$. The crack mitigating layer may have an average strain-to-failure that is greater than the average strain-to-failure of the film. The average strain-to-failure of the film may be less than the average strain-to-failure of the glass substrate.

In one or more embodiments, the crack mitigating layer may exhibit a yield stress of less than about 500 MPa and/or a modulus of about 50 GPa or less. The crack mitigating layer may have a fracture toughness of 1 MPa·m$^{1/2}$ or greater. The crack mitigating layer may include porous oxides, porous nitrides, porous carbides, porous semi-conductors, porous hybrid organic-inorganic materials, porous or nonporous polymeric materials or combinations thereof. In a specific embodiment, the crack mitigating layer comprises polyimide.

In one or more specific embodiments, the glass substrate has an average flexural strength that is maintained when the film is disposed on the first major surface and the crack mitigating layer is disposed between the glass substrate and the film. In one or more embodiments, the crack mitigating layer may include polyimide and, in such embodiments, the film has an electrical conductivity that is retained or substantially retained when the film, the crack mitigating film and glass substrate are combined.

The articles according to one or more embodiments may include an additional film disposed on the glass substrate, or more specifically on the film or on the opposite side of the glass substrate from the film. In one or more specific embodiments, the film is disposed between the glass substrate and the additional film. The additional film may include a protective layer, an adhesive layer, a planarizing layer, an anti-splintering layer, an optical bonding layer, a display layer, a polarizing layer, a light-absorbing layer, and/or combinations thereof.

A second aspect of this disclosure pertains to a touch sensor device that includes a glass substrate with opposing major surfaces, a film disposed on at least a portion of one of the opposing major surfaces of the glass substrate so that coated regions (with the film) and uncoated regions (without the film) are formed on the glass substrate. In one or more embodiments, a crack mitigating layer is disposed between the film and the glass substrate, which prevents cracks originating in one of the film or the glass substrate from bridging to the other of the film or the glass substrate. In such embodiments, the coated regions have a coated total reflectance that differs by about 5% or less from the total reflectance of the uncoated regions. The glass substrate utilized in the touch sensor devices may be strengthened or strong.

A third aspect of this disclosure pertains to a method for forming an article. One or more embodiments of the method include providing a glass substrate having opposing major surfaces, disposing a crack mitigating layer on a first major surface, and disposing a film on the crack mitigating layer, such that the crack mitigating layer is disposed between the film and the glass substrate. The method according to one or more embodiments includes controlling the thickness of the crack mitigating layer and/or the film to maintain the average flexural strength of the glass substrate and the functional properties of the film. The method includes disposing an additional film on the film, such that the film is between the glass substrate and the additional film. In one or more alternative embodiments, the additional film may be disposed on the opposite surface of the glass substrate from the film. The additional film may include a protective layer, an adhesive layer, a planarizing layer, an anti-splintering layer, an optical bonding layer, a display layer, a polarizing layer, a light-absorbing layer, and combinations thereof. The method may further include strengthening the glass substrate, which may optionally be performed before the crack mitigating layer and/or the film are disposed on the glass substrate.

DETAILED DESCRIPTION

Figure 1:
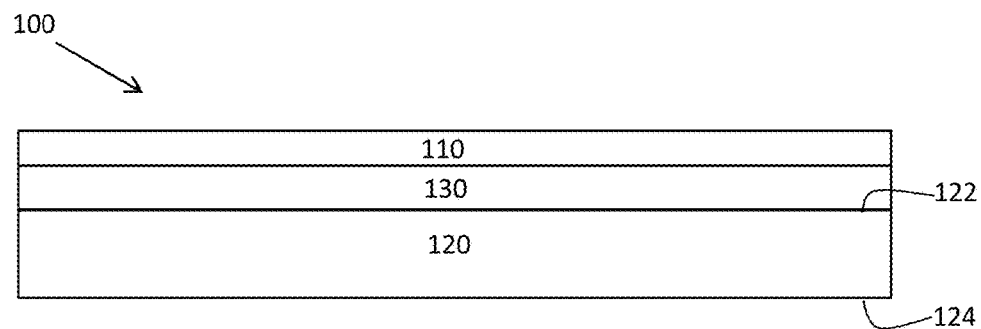
FIG. 1 is an illustration of an article comprising a glass substrate, a film and a crack mitigating layer, according to one or more embodiments.

In the following detailed description, numerous specific details may be set forth in order to provide a thorough understanding of embodiments of the disclosure. However, it will be clear to one skilled in the art when embodiments of the disclosure may be practiced without some or all of these specific details. In other instances, well-known features or processes may not be described in detail so as not to unnecessarily obscure the disclosure. In addition, like or identical reference numerals may be used to identify common or similar elements.

Referring to FIG. 1, aspects of this disclosure include an article 100 including a film 110 and a glass substrate 120 wherein the interfacial properties between the film 110 and the glass substrate 120 are modified such that the article substantially retains its average flexural strength, and the film retains key functional properties for its application. In one or more embodiments, the article exhibits functional properties that are also retained after such modification. Functional properties of the film and/or article may include optical properties, electrical properties and/or mechanical properties, such as hardness, modulus, strain-to-failure, abrasion resistance, mechanical durability, coefficient of friction, electrical conductivity, electrical resistivity, electron mobility, electron or hole carrier doping, optical refractive index, density, opacity, transparency, reflectivity, absorptivity, transmissivity and the like.

In one or more embodiment, the modification to the film-glass substrate interface includes preventing one or more cracks from bridging from one of the film 110 or the glass substrate 120 into the other of the film 110 or the glass substrate 120, while preserving other functional properties of the film 110 and/or the article. In one or more specific embodiments, as illustrated in FIG. 1, the modification of the interfacial properties includes disposing a crack mitigating layer 130 between the glass substrate 120 and the film 110.

The term "film", as applied to the film 110 and/or other films incorporated into the article 100, includes one or more layers that are formed by any known method in the art, including discrete deposition or continuous deposition processes. Such layers may be in direct contact with one another. The layers may be formed from the same material or more than one different material. In one or more alternative embodiments, such layers may have intervening layers of different materials disposed therebetween. In one or more embodiments a film may include one or more contiguous and uninterrupted layers and/or one or more discontinuous and interrupted layers (i.e., a layer having different materials formed adjacent to one another). As used herein, the term "layer" may include a single layer or a plurality of sub-layers. Layer may also include a single-molecule "monolayer".

As used herein, the term "dispose" includes coating, depositing and/or forming a material onto a surface using any known method in the art. The disposed material may constitute a layer or film as defined herein. The phrase "disposed on" includes the instance of forming a material onto a surface such that the material is in direct contact with the surface and also includes the instance where the material is formed on a surface, where one or more intervening material(s) is between the disposed material and the surface. The intervening material(s) may constitute a layer or film, as defined herein.

As used herein, the term "average flexural strength" is intended to refer to the flexural strength of a glass-containing material (e.g., an article and/or a glass substrate), as tested through methods such as ring-on-ring, ball-on-ring, or ball drop testing. The term "average" when used in connection with average flexural strength or any other property is based on the mathematical average of measurements of such property on at least 5 samples, at least 10 samples or at least 15 samples or at least 20 samples. Average flexural strength may refer to the scale parameter of two parameter Weibull statistics of failure load under ring-on-ring or ball-on-ring testing. This scale parameter is also called the Weibull characteristic strength, at which a brittle material's failure probability is 63.2%. More broadly, average flexural strength may also be defined by other tests such as a ball drop test, where the glass surface flexural strength is characterized by a ball drop height that can be tolerated without failure. Glass surface strength may also be tested in a device configuration, where an appliance or device containing the glass-containing material (e.g., an article and/or a glass substrate) article is dropped in different orientations that may create a surface flexural stress. Average flexural strength may in some cases also incorporate the strength as tested by other methods known in the art, such as 3-point bend or 4-point bend testing. In some cases, these test methods may be significantly influenced by the edge strength of the article.

In one or more embodiments, the crack mitigating layer 130 prevents one or more cracks originating in one of the film 110 or the glass substrate 120 from bridging into the other of the film 110 or the glass substrate 120. In one or more specific embodiments, the crack mitigating layer 130 prevents crack bridging from one of the film 110 or the glass substrate 120 into the other of the film 110 or the glass substrate 120 by causing an increase in the average strain-to-failure of the film 110. The crack mitigating layer 130 may increase the average strain-to-failure of the film 110 by reducing the stress that may be formed in the film 110 during formation or application on the glass substrate. In such embodiments, it is believed that the increase in the average strain-to-failure of the film 110 prevents cracks from bridging from one of the film 110 or the glass substrate 120 into the other of the film 110 or the glass substrate 120. In other embodiments, the crack mitigating layer 130 does not change the strain-to-failure of the film 110, that is, cracks still form in the film 110 under loading, but these cracks are prevented from bridging to the glass substrate 120 from the film 110 by the crack mitigating layer 130. In these embodiments, the crack mitigating layer 130 may prevent the cracks in the film 110 from bridging to the glass substrate 120 through crack tip blunting, crack arrest, crack deflection, delamination, or other related mechanisms, as will be further described below.

As used herein, the terms "bridge", or "bridging", refer to crack, flaw or defect formation and such crack, flaw or defect's growth in size and/or propagation from one material, layer or film into another material, layer or film. For example, bridging includes the instance where a crack that is present in the film 110 propagates into another material, layer or film (e.g., the glass substrate 120). The terms "bridge" or "bridging" also include the instance where a crack crosses an interface between different materials, different layers and/or different films. The materials, layers and/or films need not be in direct contact with one another for a crack to bridge between such materials, layers and/or films. For example, the crack may bridge from a first material into a second material, not in direct contact with the first material, by bridging through an intermediate material disposed between the first and second material. The same scenario may apply to layers and films and combinations of materials, layers and films. In the articles described herein, a crack may originate in one of the film 110 or the glass substrate 120 and bridge into the other of the film 110 or the glass substrate 120. As will be described herein, the crack mitigating layer 130 may prevent cracks from bridging between the film 110 and the glass substrate 120, regardless of where (i.e., the film 110 or the glass substrate 120) the crack originates.

The term "prevent", when associated with prevention of crack bridging, refers to preventing crack bridging at one or more selected load level(s) (or ranges of loads) or flexural state(s). This does not imply that crack bridging is prevented for all load levels or flexural states. Rather, this generally implies that crack bridging is prevented for a particular load, stress, or strain level or range that would ordinarily cause crack bridging without the presence of the crack mitigating layer.

Figure 2:
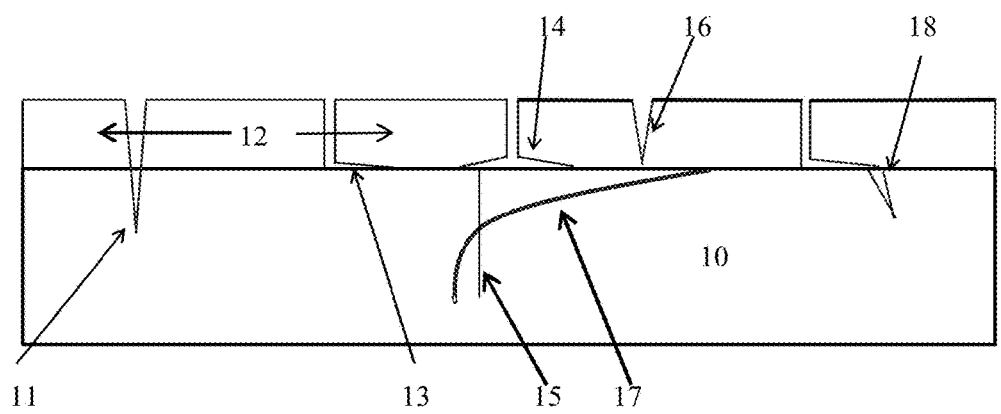
FIG. 2 is a schematic diagram of the development of a crack in a film and its possible bridging modes.

The following theoretical fracture mechanics analysis illustrates the ways in which cracks may bridge within a article. FIG. 2 is a schematic illustrating the presence of a crack in a film disposed on a glass substrate and its possible bridging modes. The numbered elements in FIG. 2 are the glass substrate 10, the film 12 on top of a surface (unnumbered) of glass substrate 10, a two-sided deflection 14 into the interface between glass substrate 10 and film 12, an arrest 16 which is a crack that started to develop in film 12 but did not go completely through film 12, a "kinking" 18 which is a crack that developed in the surface of film 12, but when it reached the surface of the glass substrate 10 it did not penetrate into the glass substrate 12, instead it moved in a lateral direction as indicated in FIG. 2 and then penetrates the surface of the glass substrate 10 at another position, a penetration crack 11 that developed in the film 12 and penetrated into the glass substrate 10, a one-sided deflection 13, and a graph of tension vs. compression 17 in the glass substrate 10 compared to zero axis 15. Note that this schematic is not to scale and the glass substrate thickness typically extends further past the bottom of the figure (not shown). As illustrated, upon application of external loading (in such cases, tensile loading is the most detrimental situation), the flaws in the film can be preferentially activated to form cracks prior to the development of cracks in the residually compressed glass substrate. In the scenarios illustrated in FIG. 2, with continued increase of external loading, the cracks will bridge until they encounter the glass substrate. When the cracks reach the surface of substrate 10 the possible bridging modes of the crack, when it originates in the film are: (a) penetration into the glass substrate without changing its path as represented by numeral 11; (b) deflection into one side along the interface between the film and the glass substrate as indicated by numeral 13; (c) deflection into two sides along the interface as indicated by numeral 14, (d) first deflection along the interface and then kinking into the glass substrate as indicated by numeral 18, or (e) crack arrest as indicated by numeral 16 due to microscopic deformation mechanisms, for example, plasticity, nano-scale blunting, or nano-scale deflection at the crack tip. Cracks may originate in the film and may bridge into the glass substrate. The above described bridging modes are also applicable where cracks originate in the glass substrate and bridge into the film, for example where pre-existing cracks or flaws in the glass substrate may induce or nucleate cracks or flaws in the film, thus leading to crack growth or propagation from the glass substrate into the film, resulting in crack bridging.

Crack penetration into the glass substrate and/or film reduces the average flexural strength of the article and the glass substrate as compared to the average flexural strength of the glass substrate alone (i.e., without a film or a crack mitigating layer), while crack deflection, crack blunting or crack arrest (collectively referred to herein as crack mitigation) is preferable to help retain the average flexural strength of the article. Crack blunting and crack arrest can be distinguished from one another. Crack blunting may comprise an increasing crack tip radius, for example, through plastic deformation or yielding mechanisms. Crack arrest, on the other hand, could comprise a number of different mechanisms such as, for example, encountering a highly compressive stress at the crack tip a reduction of the stress intensity factor at the crack tip resulting from the presence of a low-modulus interlayer or a low-modulus-to-high-modulus interface transition; nano-scale crack deflection or crack tortuosity, nano-scale crack deflection or crack tortuosity as in some polycrystalline or composite materials, strain hardening at the crack tip and the like.

Without being bound by theory, certain possible crack bridging paths can be analyzed in the context of linear elastic fracture mechanics. In the following paragraphs, one crack path is used as an example and the fracture mechanics concept is applied to the crack path to analyze the problem and illustrate the requirements of material parameters to help retain the average flexural strength performance of the article, for a particular range of materials properties.

Figure 3:
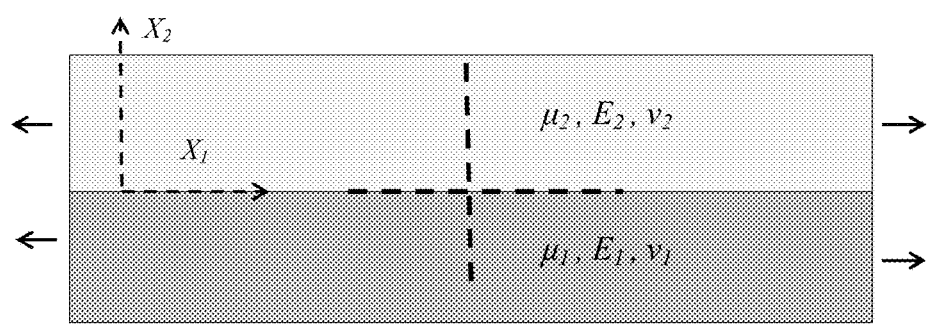
FIG. 3 is an illustration of the theoretical model for the presence of a crack in a film and its possible bridging as a function of elastic mismatch α.

FIG. 3 below shows the illustration of the theoretical model framework. This is a simplified schematic view of the interface region between the film 12 and glass substrate 10. The terms $\mu_1$, $E_1$, $v_1$, and $\mu_2$, $E_2$, $v_2$, are shear modulus, Young's modulus, Poisson's ratio of glass substrate and film materials, $\Gamma_c^{Glass}$ and $\Gamma_c^{IT}$ are critical energy release rate of glass substrate and the interface between substrate and film, respectively.

The common parameters to characterize the elastic mismatch between the film and the substrate are Dundurs' parameters $\alpha$ and $\beta$ [1], as defined below $$\alpha = \frac{\overline{E}_1 - \overline{E}_2}{\overline{E}_1 + \overline{E}_2} \quad (1)$$

where $\overline{E} = E/(1-v^2)$ for plain strain and $$\beta = \frac{1}{2} \frac{\mu_1(1 - 2v_2) - \mu_2(1 - 2v_1)}{\mu_1(1 - v_2) + \mu_2(1 - v_1)} \quad (2)$$

It is worth pointing out that critical energy release rate is closely related with the fracture toughness of the material through the relationship defined as $$\Gamma = \frac{1 - v^2}{E} K_C^2 \quad (3)$$

Under the assumption that there is a pre-existing flaw in the film, upon tensile loading the crack will extend vertically down as illustrated in FIG. 3. Right at the interface, the crack tends to deflect along the interface if $$\frac{G_d}{G_p} \geq \frac{\Gamma_c^{IT}}{\Gamma_c^{Glass}} \quad (4)$$

and the crack will penetrate into the glass substrate if $$\frac{G_d}{G_p} \leq \frac{\Gamma_c^{IT}}{\Gamma_c^{Glass}} \quad (5)$$

where $G_d$ and $G_p$, and are energy release rates between deflected crack along the interface and the penetrated crack into the glass substrate [1]. On the left hand side of equations (4) and (5), the ratio $G_d/G_p$ is a strong function of elastic mismatch parameter α and weakly dependent on β; and on the right hand side, the toughness ratio $\Gamma_c^{IT}/\Gamma_c^{Glass}$ is a material parameter.

Figure 4:
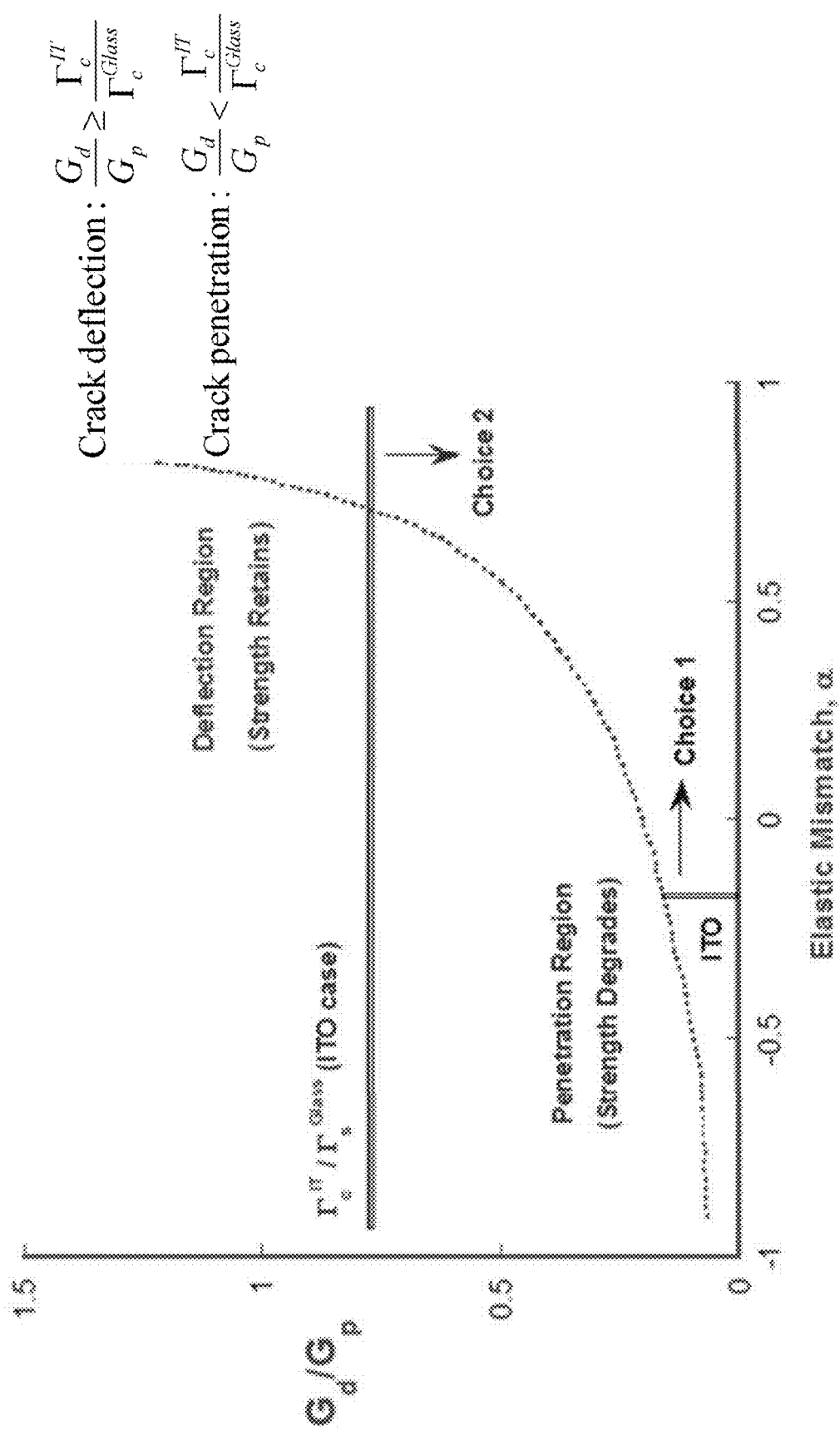
FIG. 4 is a diagram illustrating the energy release ratio $G_d/G_p$.

FIG. 4 graphically illustrates the trend of $G_d/G_p$ as a function of elastic mismatch a, reproduced from reference for doubly deflected cracks. (Ming-Yuan, H. and J. W. Hutchinson, *Crack deflection at an interface between dissimilar elastic materials*. International Journal of Solids and Structures, 1989. 25(9): p. 1053-1067.).

It is evident that the ratio $G_d/G_p$ is strongly dependent on α. Negative α means the film is stiffer than the glass substrate and positive α means the film is softer than the glass substrate. The toughness ratio $\Gamma_c^{IT}/\Gamma_c^{Glass}$, which is independent of α is a horizontal line in FIG. 4. If criterion (4) is satisfied, in FIG. 4, at the region above the horizontal line, the crack tends to deflect along the interface and therefore is beneficial for the retention of a substrate's average flexural strength. On the other hand, if the criterion (5) is satisfied, in FIG. 4, at the region below the horizontal line, the crack tends to penetrate into glass substrate resulting in degradation of the average flexural strength.

With the above concept, in the following, an indium-tin-oxide (ITO) film is utilized as an illustrative example. For glass substrate, $E_1$=72 GPa, $v_1$=0.22, and $K_{1c}$=0.7 MPa $m^{1/2}$; for ITO, $E_2$=99.8 GPa, $v_2$=0.25. (Zeng, K., et al., *Investigation of mechanical properties of transparent conducting oxide thin films*. Thin Solid Films, 2003. 443(1-2): p. 60-65.). The interfacial toughness between the ITO film and glass substrate can be approximately $\Gamma_{in}$=5 J/m², depending on deposition conditions. (Cotterell, B. and Z. Chen, *Buckling and cracking of thin films on compliant substrates under compression*. International Journal of Fracture, 2000. 104(2): p. 169-179.). This will give the elastic mismatch α=−0.17 and $\Gamma_c^{IT}/\Gamma_c^{Glass}$=0.77. These values are plotted in FIG. 4. This fracture analysis predicts that the crack penetration into the glass substrate for the ITO film leading to degradation of the average flexural strength of the glass. This is believed to be one of the potential underlying mechanisms observed with various indium-tin-oxide or other transparent conductive oxide films that are disposed on glass substrates, including strengthened or strong glass substrates. As shown in FIG. 4, one way to mitigate the degradation of the average flexural strength can be to select appropriate materials to change the elastic mismatch α (choice 1) or to adjust the interfacial toughness (choice 2).

The theoretical analysis outlined above suggests that a crack mitigating layer 130 can be used to better retain the article strength. Specifically, the insertion of a crack mitigating layer between a glass substrate 120 and a film 110 makes crack mitigation, as defined herein, a more preferred path and thus the article is better able to retain its strength.

Glass Substrate

Referring to FIG. 1, the article 100 includes a glass substrate 120, which may be strengthened or strong, as described herein, having opposing major surfaces 122, 124, a film 110 disposed on a at least one opposing major surface (122 or 124) and a crack mitigating layer 130 disposed between the film 110 and the glass substrate 120. In one or more alternative embodiments, the crack mitigating layer 130 and the film 110 may be disposed on the minor surface(s) of the glass substrate in addition to or instead of being disposed on at least one major surface (122 or 124). As used herein, the glass substrate 120 may be substantially planar sheets, although other embodiments may utilize a curved or otherwise shaped or sculpted glass substrate. The glass substrate 120 may be substantially clear, transparent and free from light scattering. The glass substrate may have a refractive index in the range from about 1.45 to about 1.55. In one or more embodiments, the glass substrate 120 may be strengthened or characterized as strong, as will be described in greater detail herein. The glass substrate 120 may be relatively pristine and flaw-free (for example, having a low number of surface flaws or an average surface flaw size less than about 1 micron) before such strengthening. Where strengthened or strong glass substrates 120 are utilized, such substrates may be characterized as having a high average flexural strength (when compared to glass substrates that are not strengthened or strong) or high surface strain-to-failure (when compared to glass substrates that are not strengthened or strong) on one or more major opposing surfaces of such substrates.

Additionally or alternatively, the thickness of the glass substrate 120 may vary along one or more of its dimensions for aesthetic and/or functional reasons. For example, the edges of the glass substrate 120 may be thicker as compared to more central regions of the glass substrate 120. The length, width and thickness dimensions of the glass substrate 120 may also vary according to the article 100 application or use.

The glass substrate 120 according to one or more embodiments includes an average flexural strength that may be measured before and after the glass substrate 120 is combined with the film 110, crack mitigating layer 130 and/or other films or layers. In one or more embodiments described herein, the article 100 retains its average flexural strength after the combination of the glass substrate 120 with the film 110, crack mitigating layer 130 and/or other films, layers or materials, when compared to the average flexural strength of the glass substrate 120 before such combination. In other words, the average flexural strength of the article 100 is substantially the same before and after the film 110, crack mitigating layer 130 and/or other films or layers are disposed on the glass substrate 120. In one or more embodiments, the article 100 has an average flexural strength that is significantly greater than the average flexural strength of a similar article that does not include the crack mitigating layer 130 (e.g. higher strength than an article that comprises film 110 and glass substrate 120 in direct contact, without an intervening crack mitigating layer).

In accordance with one or more embodiments, the glass substrate 120 has an average strain-to-failure that may be measured before and after the glass substrate 120 is combined with the film 110, crack mitigating layer 130 and/or other films or layers. The term "average strain-to-failure" refers to the strain at which cracks propagate without application of additional load, typically leading to catastrophic failure in a given material, layer or film and, perhaps even bridge into another material, layer of film, as defined herein. Average strain-to-failure may be measured using, for example, ball-on-ring testing. Without being bound by theory, the average strain-to-failure may be directly correlated to the average flexural strength using appropriate mathematical conversions. In specific embodiments, the glass substrate 120, which may be strengthened or strong as described herein, has an average strain-to-failure that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater. In specific embodiments, the glass substrate has an average strain-to-failure of 1.2%, 1.4%, 1.6%, 1.8%, 2.2%, 2.4%, 2.6%, 2.8% or 3% or greater. The average strain-to-failure of the film 110 may be less than the average strain-to-failure of the glass substrate 120 and/or the average strain-to-failure of the crack mitigating layer 130. Without being bound by theory, it is believed that the average strain-to-failure of a glass substrate or any other material is dependent on the surface quality of such material. With respect to glass substrates, the average strain-to-failure of a specific glass substrate is dependent on the conditions of ion exchange or strengthening process utilized in addition to or instead of the surface quality of the glass substrate.

In one or more embodiments, the glass substrate 120 retains its average strain-to-failure after combination with the film 110, crack mitigating layer 130 and/or other films or layers. In other words, the average strain-to-failure of the glass substrate 120 is substantially the same before and after the film 110, crack mitigating layer 130 and/or other films or layers are disposed on the glass substrate 120.

The glass substrate 120 may be provided using a variety of different processes. For instance, example glass substrate forming methods include float glass processes and down-draw processes such as fusion draw and slot draw.

In the float glass process, a glass substrate that may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass substrate that can be lifted from the tin onto rollers. Once off the bath, the glass substrate can be cooled further and annealed to reduce internal stress.

Down-draw processes produce glass substrates having a uniform thickness that may possess relatively pristine surfaces. Because the average flexural strength of the glass substrate is controlled by the amount and size of surface flaws, a pristine surface that has had minimal contact has a higher initial strength. When this high strength glass substrate is then further strengthened (e.g., chemically), the resultant strength can be higher than that of a glass substrate with a surface that has been lapped and polished. Down-drawn glass substrates may be drawn to a thickness of less than about 2 mm. In addition, down drawn glass substrates may have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass substrate. The fusion draw method offers the advantage that, because the two glass films flowing over the channel fuse together, neither of the outside surfaces of the resulting glass substrate comes in contact with any part of the apparatus. Thus, the surface properties of the fusion drawn glass substrate are not affected by such contact.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous substrate and into an annealing region.

Once formed, glass substrates may be strengthened to form strengthened glass substrates. As used herein, the term "strengthened glass substrate" may refer to a glass substrate that has been chemically strengthened, for example through ion-exchange of larger ions for smaller ions in the surface of the glass substrate. However, other strengthening methods known in the art, such as thermal tempering, may be utilized to form strengthened glass substrates. As will be described, strengthened glass substrates may include a glass substrate having a surface compressive stress in its surface that aids in the strength preservation of the glass substrate. Strong glass substrates are also within the scope of this disclosure and include glass substrates that may not have undergone a specific strengthening process, and may not have a surface compressive stress, but are nevertheless strong. Such strong glass substrates articles may be defined as glass sheet articles or glass substrates having an average strain-to-failure greater than about 0.5%, 0.7%, 1%, 1.5%, or even greater than 2%. Such strong glass substrates can be made, for example, by protecting the pristine glass surfaces after melting and forming the glass substrate. An example of such protection occurs in a fusion draw method, where the surfaces of the glass films do not come into contact with any part of the apparatus or other surface after forming. The glass substrates formed from a fusion draw method derive their strength from their pristine surface quality. A pristine surface quality can also be achieved through etching or polishing and subsequent protection of glass substrate surfaces, and other methods known in the art. In one or more embodiments, both strengthened glass substrates and the strong glass substrates may comprise glass sheet articles having an average strain-to-failure greater than about 0.5%, 0.7%, 1%, 1.5%, or even greater than 2%, for example when measured using ring-on-ring or ball-on-ring flexural testing.

As mentioned above, the glass substrates described herein may be chemically strengthened by an ion exchange process to provide a strengthened glass substrate 120. The glass substrate may also be strengthened by other methods known in the art, such as thermal tempering. In the ion-exchange process, typically by immersion of the glass substrate into a molten salt bath for a predetermined period of time, ions at or near the surface(s) of the glass substrate are exchanged for larger metal ions from the salt bath. In one embodiment, the temperature of the molten salt bath is about 350° C. to 450° C. and the predetermined time period is about two to about eight hours. The incorporation of the larger ions into the glass substrate strengthens the glass substrate by creating a compressive stress in a near surface region or in regions at and adjacent to the surface(s) of the glass substrate. A corresponding tensile stress is induced within a central region or regions at a distance from the surface(s) of the glass substrate to balance the compressive stress. Glass substrates utilizing this strengthening process may be described more specifically as chemically-strengthened glass substrates 120 or ion-exchanged glass substrates 120. Glass substrates that are not strengthened may be referred to herein as non-strengthened glass substrates.

In one example, sodium ions in a strengthened glass substrate 120 are replaced by potassium ions from the molten bath, such as a potassium nitrate salt bath, though other alkali metal ions having larger atomic radii, such as rubidium or cesium, can replace smaller alkali metal ions in the glass. According to particular embodiments, smaller alkali metal ions in the glass can be replaced by $Ag^+$ ions. Similarly, other alkali metal salts such as, but not limited to, sulfates, phosphates, halides, and the like may be used in the ion exchange process.

The replacement of smaller ions by larger ions at a temperature below that at which the glass network can relax produces a distribution of ions across the surface(s) of the strengthened glass substrate 120 that results in a stress profile. The larger volume of the incoming ion produces a compressive stress (CS) on the surface and tension (central tension, or CT) in the center of the strengthened glass substrate 120. The compressive stress is related to the central tension by the following relationship:

$$CS = CT\left(\frac{t - 2DOL}{DOL}\right)$$

where t is the total thickness of the strengthened glass substrate 120 and compressive depth of layer (DOL) is the depth of exchange. Depth of exchange may be described as the depth within the strengthened glass substrate 120 (i.e., the distance from a surface of the glass substrate to a central region of the glass substrate), at which ion exchange facilitated by the ion exchange process takes place.

In one embodiment, a strengthened glass substrate 120 can have a surface compressive stress of 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened glass substrate 120 may have a compressive depth of layer 15 μm or greater, 20 μm or greater (e.g., 25 μm, 30 μm, 35 μm, 40 μm, 45 μm, 50 μm or greater) and/or a central tension of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened glass substrate 120 has one or more of the following: a surface compressive stress greater than 500 MPa, a depth of compressive layer greater than 15 μm, and a central tension greater than 18 MPa.

Without being bound by theory, it is believed that strengthened glass substrates 120 with a surface compressive stress greater than 500 MPa and a compressive depth of layer greater than about 15 μm typically have greater strain-to-failure than non-strengthened glass substrates (or, in other words, glass substrates that have not been ion exchanged or otherwise strengthened). In some embodiments, the benefits of one or more embodiments described herein may not be as prominent with non-strengthened or weakly strengthened types of glass substrates that do not meet these levels of surface compressive stress or compressive depth of layer, because of the presence of handling or common glass surface damage events in many typical applications. However, as mentioned previously, in other specific applications where the glass substrate surfaces can be adequately protected from scratches or surface damage (for example by a protective coating or other layers), strong glass substrates with a relatively high strain-to-failure can also be created through forming and protection of a pristine glass surface quality, using methods such as the fusion forming method. In these alternate applications, the benefits of one or more embodiments described herein can be similarly realized.

Example ion-exchangeable glasses that may be used in the strengthened glass substrate 120 may include alkali aluminosilicate glass compositions or alkali aluminoborosilicate glass compositions, though other glass compositions are contemplated. As used herein, "ion exchangeable" means that a glass substrate is capable of exchanging cations located at or near the surface of the glass substrate with cations of the same valence that are either larger or smaller in size. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass substrate 120 includes a glass composition with at least 6 wt. % aluminum oxide. In a further embodiment, a glass substrate 120 includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the glass substrate 120 can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the glass substrate 120, which may optionally be strengthened or strong, comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the glass substrate 120, which may optionally be strengthened or strong, comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for the glass substrate 120, which may optionally be strengthened or strong, comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass composition, in particular embodiments, comprise: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In still another embodiment, the glass substrate, which may optionally be strengthened or strong, may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2$+$B_2O_3$+CaO≤69 mol. %; $Na_2O$+$K_2O$+$B_2O_3$+MgO+CaO+SrO>10 mol. %; 5 mol. %≤MgO+CaO+SrO≤8 mol. %; ($Na_2O$+$B_2O_3$)—$Al_2O_3$≤2 mol. %; 2 mol. %≤$Na_2O$—$Al_2O_3$≤6 mol. %; and 4 mol. %≤($Na_2O$+$K_2O$)—$Al_2O_3$≤10 mol. %.

In some embodiments, the glass substrate 120, which may optionally be strengthened or strong, may comprise an alkali silicate glass composition comprising: 2 mol % or more of $Al_2O_3$ and/or $ZrO_2$, or 4 mol % or more of $Al_2O_3$ and/or $ZrO_2$.

In some embodiments, the glass substrate used in the glass substrate 120 may be batched with 0-2 mol. % of at least one fining agent selected from a group that includes $Na_2SO_4$, NaCl, NaF, NaBr, $K_2SO_4$, KCl, KF, KBr, and $SnO_2$.

The glass substrate 120 according to one or more embodiments can have a thickness ranging from about 50 µm to 5 mm. Example glass substrate 120 thicknesses range from 100 µm to 500 µm, e.g., 100, 200, 300, 400 or 500 µm. Further example glass substrate 120 thicknesses range from 500 µm to 1000 µm, e.g., 500, 600, 700, 800, 900 or 1000 µm. The glass substrate 120 may have a thickness greater than 1 mm, e.g., about 2, 3, 4, or 5 mm. In one or more specific embodiments, the glass substrate 120 may have a thickness of 2 mm or less or less than 1 mm. The glass substrate 120 may be acid polished or otherwise treated to remove or reduce the effect of surface flaws.

Film

The article 100 includes a film 110 disposed on a surface of the glass substrate 120. The film 110 may be disposed on one or both major surfaces 122, 124 of the glass substrate 120. In one or more embodiments, the film 110 may be disposed on one or more minor surfaces (not shown) of the glass substrate 120 in addition to or instead of being disposed on one or both major surfaces 122, 124. In one or more embodiments, the film 110 is free of macroscopic scratches or defects that are easily visible to the eye.

In one or more embodiments, the film 110 may lower the average flexural strength of articles incorporating such a film and glass substrate, through the mechanisms described herein. In one or more embodiments, such mechanisms include instances in which the film 110 may lower the average flexural strength of the article because crack(s) developing in such film bridge into the glass substrate. In other embodiments, the mechanisms include instances in which the film may lower the average flexural strength of the article because cracks developing in the glass substrates bridge into the film. The film 110 of one or more embodiments may exhibit a strain-to-failure of 2% or less or a strain-to-failure that is less than the strain to failure of the glass substrates described herein. Films including any of these attributes may be characterized as brittle.

In accordance with one or more embodiments, the film 110 may have a strain-to-failure (or crack onset strain level) that is lower than the strain-to-failure of the glass substrate 120. For example, the film 110 may have strain-to-failure of about 2% or less, about 1.8% or less, about 1.6% or less, about 1.5% or less, about 1.4% or less, about 1.2% or less, about 1% or less, about 0.8% or less, about 0.6% or less, about 0.5% or less, about 0.4% or less or about 0.2% or less. In some embodiments, the strain-to-failure of the film 110 may be lower than that the strain-to-failure of the strengthened glass substrates 120 that have a surface compressive stress greater than 500 MPa and a compressive depth of layer greater than about 15 µm. In one or more embodiments, the film 110 may have a strain-to-failure that is at least 0.1% lower or less, or in some cases, at least 0.5% lower or less than the strain-to-failure of the glass substrate 120. In one or more embodiments, the film 110 may have a strain-to-failure that is at least 0.15%, 0.2%, 0.25%, 0.3%, 0.35%, 0.4%, 0.45%, 0.55%, 0.6%, 0.65%, 0.7%, 0.75%, 0.8%, 0.85%, 0.9%, 0.95% or 1% lower or less than the strain-to-failure of the glass substrate 120.

Exemplary films 110 may have a modulus of at least 25 GPa and/or a hardness of at least 1.75 GPa, although some combinations outside of this range are possible. In some embodiments the film 110 may have a modulus 50 GPa or greater or even 70 GPa or greater. For example, the film modulus may be 55 GPa, 60 GPa, 65 GPa, 75 GPa, 80 GPa, 85 GPa or more. In one or more embodiments, the film 110 may have a hardness greater than 3.0 GPa. For example, the film 110 may have a hardness of 5 GPa, 5.5 GPa, 6 GPa, 6.5 GPa, 7 GPa, 7.5 GPa, 8 GPa, 8.5 GPa, 9 GPa, 9.5 GPa, 10 GPa or greater. These modulus and hardness values can be measured for such films 110 using known diamond nano-indentation methods that are commonly used for determining the modulus and hardness of films. Exemplary diamond nano-indentation methods may utilize a Berkovich diamond indenter.

The films 110 described herein may also exhibit a fracture toughness less than about 10 MPa·m$^{1/2}$, or in some cases less than 5 MPa·m$^{1/2}$, or in some cases less than 1 MPa·m$^{1/2}$. For example, the film may have a fracture toughness of 4.5 MPa·m$^{1/2}$, 4 MPa·m$^{1/2}$, 3.5 Mpa·m$^{1/2}$, 3 Mpa·m$^{1/2}$, 2.5 Mpa·m$^{1/2}$, 2 Mpa·m$^{1/2}$, 1.5 Mpa·m$^{1/2}$, 1.4 MPa·m$^{1/2}$, 1.3 MPa·m$^{1/2}$, 1.2 MPa·m$^{1/2}$, 1.1 MPa·m$^{1/2}$, 0.9 MPa·m$^{1/2}$, 0.8 MPa·m$^{1/2}$, 0.7 MPa·m$^{1/2}$, 0.6 MPa·m$^{1/2}$, 0.5 MPa·m$^{1/2}$, 0.4 MPa·m$^{1/2}$, 0.3 MPa·m$^{1/2}$, 0.2 MPa·m$^{1/2}$, 0.1 MPa·m$^{1/2}$ or less.

The films 110 described herein may also have a critical strain energy release rate ($G_{IC}$=$K_{IC}^2$/E) that is less than about 0.1 kJ/m$^2$, or in some cases less than 0.01 kJ/m$^2$. In one or more embodiments, the film 110 may have a critical strain energy release rate of 0.09 kJ/m$^2$, 0.08 kJ/m$^2$, 0.07 kJ/m$^2$, 0.06 kJ/m$^2$, 0.05 kJ/m$^2$, 0.04 kJ/m$^2$, 0.03 kJ/m$^2$, 0.02 kJ/m$^2$, 0.0075 kJ/m$^2$, 0.005 kJ/m$^2$, 0.0025 kJ/m$^2$ or less.

In one or more embodiments, the film 110 may include a plurality of layers. Each of the layers of the film may be characterized as brittle based on one or more of the layer's impact on the average flexural strength of the article and/or the layer's strain-to-failure, fracture toughness, or critical strain energy release rate values, as otherwise described herein. In one variant, the layers of the film 110 need not have identical properties such as modulus and/or fracture toughness. In another variant, the layers of the film 110 may include different materials from one another.

In one or more embodiments, the film 110 may have a tensile stress that was built in the film or introduced into the film during deposition or formation. In some cases, the tensile stress into the film 110 may be difficult to avoid while retaining the other desired properties. This tensile stress can cause a film 110 to crack or fail more readily, for example, in some cases this tensile stress may lower the strain-to-failure (crack onset strain) of the film 110. Moreover, cracks originating in the film 110 can bridge more readily from the film 110 into the glass substrate 120 under the right conditions, due in part to the tensile stress. Additionally or alternatively, the tensile stress in the film 110 may cause the a film 110 to crack or fail more readily because cracks originating in the glass substrate 120 can bridge more readily from the glass substrate 120 into the film 110 under the right conditions. As will be described in greater detail below, the crack mitigating layer 130 may allow the film 110 to relax during deposition or formation, where the film is disposed on the glass substrate 120 after the crack mitigating layer 130 is disposed on the glass substrate 120. Additionally or alternatively, the crack mitigating layer 130 may reduce the amount of stress that is created locally in the film 110 during loading (i.e., during the application of an external force on the film, such as the flexure experienced by the film during ring-on-ring testing), or during flexure of the article 100.

The compositions or material(s) of the film 110 are not particularly limited. Some non-limiting examples of film 110 materials include oxides such as $SiO_2$, $Al_2O_3$, $TiO_2$, $Nb_2O_5$, $Ta_2O_5$; oxynitrides such as $SiO_xN_y$, $SiAl_xO_yN_z$, and $AlO_xN_y$; nitrides such as $SiN_x$, $AlN_x$, cubic boron nitride, and $TiN_x$; carbides such as SiC, TiC and WC, semiconductor materials such as Si and Ge; transparent conductors such as indium-tin-oxide, tin oxide, fluorinated tin oxide, aluminum zinc oxide, or zinc oxide; carbon nanotube or graphene-doped oxides; silver or other metal-doped oxides; highly siliceous polymers such as highly cured siloxanes and silsesquioxanes; diamond or diamond-like-carbon materials; or selected metal films which can exhibit a brittle fracture behavior.

The film 110 can be disposed on the glass substrate 120 by vacuum deposition techniques, for example, chemical vapor deposition (e.g., plasma enhanced chemical vapor deposition or atmospheric pressure chemical vapor deposition), physical vapor deposition (e.g., reactive or nonreactive sputtering or laser ablation), thermal, resistive, or e-beam evaporation, or atomic layer deposition. The film 110 may also be disposed on one or more surfaces 122, 124 of the glass substrate 120 using liquid-based techniques, for example sol-gel coating or polymer coating methods, for example spin, spray, slot draw, slide, wire-wound rod, blade/knife, air knife, curtain, gravure, and roller coating among others. In some embodiments it may be desirable to use adhesion promoters, such as silane-based materials, between the film 110 and the glass substrate 120, between the glass substrate 120 and crack mitigating layer 130, between the layers (if any) of the crack mitigating layer 130, between the layers (if any) of the film 110 and/or between the film 110 and the crack mitigating layer 130. In one or more alternative embodiments, the film 110 may be disposed on the glass substrate 120 as a transfer layer.

The film 110 thickness can vary depending on the intended use of the article 100. In one embodiment the film 110 thickness may be in the ranges from about 0.01 μm to about 0.5 μm or from about 0.01 μm to about 20 μm. In another embodiment, the film 110 may have a thickness in the range from about 0.05 μm to about 10 μm, from about 0.05 μm to about 0.5 μm, from about 0.01 μm to about 0.15 μm or from about 0.015 μm to about 0.2 μm.

In some embodiments it may be advantageous to include a material in the film 110 that has either:

(1) a refractive index that is similar to the refractive index of either the glass substrate 120, the crack mitigating layer 130 and/or other films or layers in order to minimize optical interference effects;

(2) a refractive index (real and/or imaginary components) that is tuned to achieve anti-reflective interference effects; and/or (3) a refractive index (real and/or imaginary components) that is tuned to achieve wavelength-selective reflective or wavelength-selective absorptive effects, such as to achieve UV or IR blocking or reflection, or to achieve coloring/tinting effects.

In one or more embodiments, the film 110 may have a refractive index that is greater than the refractive index of the glass substrate 120 and/or greater than the refractive index of the crack mitigating layer 130. In one or more embodiments, the film may have a refractive index in the range from about 1.7 to about 2.2, or in the range from about 1.4 to about 1.6, or in the range from about 1.6 to about 1.9.

The film 110 may also serve multiple functions, or be integrated with films or layers that serve other functions than the film 110 or even the same function(s) as the film 110. The film 110 may include UV or IR light reflecting or absorbing layers, anti-reflection layers, anti-glare layers, dirt-resistant layers, self-cleaning layers, scratch-resistant layers, barrier layers, passivation layers, hermetic layers, diffusion-blocking layers, fingerprint-resistant layers, and the like. Further, the film 110 may include conducting or semi-conducting layers, thin film transistor layers, EMI shielding layers, breakage sensors, alarm sensors, electrochromic materials, photochromic materials, touch sensing layers, or information display layers. The film 110 and/or any of the foregoing layers may include colorants or tint. When information display layers are integrated into the article 100, the article 100 may form part of a touch-sensitive display, a transparent display, or a heads-up display. It may be desirable that the film 110 performs an interference function, which selectively transmits, reflects, or absorbs different wavelengths or colors of light. For example, the films 110 may selectively reflect a targeted wavelength in a heads-up display application.

Functional properties of the film 110 may include optical properties, electrical properties and/or mechanical properties, such as hardness, modulus, strain-to-failure, abrasion resistance, mechanical durability, coefficient of friction, electrical conductivity, electrical resistivity, electron mobility, electron or hole carrier doping, optical refractive index, density, opacity, transparency, reflectivity, absorptivity, transmissivity and the like. These functional properties are substantially maintained or even improved after the film 110 is combined with the glass substrate 120, crack mitigating layer 130 and/or other films included in the article 100.

Crack Mitigating Layer

The crack mitigating layer 130 according to one or more embodiments may have a critical strain energy release rate ($G_{IC}=K_{IC}^2/E$) that is greater than the critical strain energy release rate of the film 110. In one or more embodiments, the film 110 may have a critical strain energy release rate of about 0.1 $kJ/m^2$ or less and the crack mitigating layer 130 may have a critical strain energy release rate of greater than about 0.1 $kJ/m^2$. The crack mitigating layer 130 may have a critical strain energy release rate of about 1.0 $kJ/m^2$ or greater. In specific embodiments, the crack mitigating layer 130 may have a critical strain energy release rate in a range of about 0.05 $kJ/m^2$ to about 100 $kJ/m^2$, while the film 110 may have a critical strain energy release rate less than about 0.05 $kJ/m^2$. The crack mitigating layer 130 may have a critical strain energy release rate in the range from about 0.05 $kJ/m^2$ to about 90 $kJ/m^2$, from about 0.5 $kJ/m^2$ to about 80 $kJ/m^2$, from about 0.5 $kJ/m^2$ to about 70 $kJ/m^2$, from about 0.5 $kJ/m^2$ to about 60 $kJ/m^2$, from about 0.5 $kJ/m^2$ to about 50 $kJ/m^2$, from about 0.5 $kJ/m^2$ to about 40 $kJ/m^2$, from about 0.5 $kJ/m^2$ to about 30 $kJ/m^2$, from about 0.5 $kJ/m^2$ to about 20 $kJ/m^2$, from about 0.5 $kJ/m^2$ to about 10 $kJ/m^2$, from about 0.5 $kJ/m^2$ to about 5 $kJ/m^2$, from about 1 $kJ/m^2$ to about 100 $kJ/m^2$, from about 5 $kJ/m^2$ to about 100 kJ/m², from about 10 kJ/m² to about 100 kJ/m², from about 20 kJ/m² to about 100 kJ/m², from about 30 kJ/m² to about 100 kJ/m², from about 40 kJ/m² to about 100 kJ/m², from about 50 kJ/m² to about 100 kJ/m², from about 60 kJ/m² to about 100 kJ/m², from about 70 kJ/m² to about 100 kJ/m², from about 80 kJ/m² to about 100 kJ/m², from about 90 kJ/m² to about 100 kJ/m², from about 0.05 kJ/m² to about 1 kJ/m², from about 1 kJ/m² to about 5 kJ/m², from about 5 kJ/m² to about 10 kJ/m², from about 10 kJ/m² to about 20 kJ/m², from about 20 kJ/m² to about 30 kJ/m², from about 30 kJ/m² to about 40 kJ/m², from about 40 kJ/m² to about 50 kJ/m², from about 50 kJ/m² to about 60 kJ/m², from about 60 kJ/m² to about 70 kJ/m², from about 70 kJ/m² to about 80 kJ/m² and from about 80 kJ/m² to about 90 kJ/m².

In such embodiments, the crack mitigating layer 130 has a greater critical strain energy release rate than the film 110 and, therefore, can release strain energy from a crack bridging from one of the film 110 and the glass substrate 120 into the other of the film 110 and the glass substrate 120. Such strain energy release stops the crack from bridging across the interface between the film 110 and the glass substrate 120. In one or more embodiments, the crack mitigation mechanism(s) described herein occur regardless of where the crack originates (i.e., the film 110 or the glass substrate 120).

In accordance with one or more embodiments, the crack mitigating layer 130 may have an average strain-to-failure that is greater than the average strain-to-failure of the film 110. In one or more embodiments, the crack mitigating layer 130 may have an average strain-to-failure that is equal to or greater than about 0.5%, 0.7%, 1%, 1.5%, 2%, or even 4%. The crack mitigating layer 130 may have an average strain-to-failure of 0.6%, 0.8%, 0.9%, 1.1%, 1.2%, 1.3%, 1.4%, 1.6%, 1.7%, 1.8%, 1.9%, 2.2%, 2.4%, 2.6%, 2.8%, 3%, 3.2%, 3.4%, 3.6%, 3.8%, 5% or 6% or greater. In one or more embodiments, the film 110 may have an average strain-to-failure (crack onset strain) that is 1.5%, 1.0%, 0.7%, 0.5%, or even 0.4% or less. The film 110 may have an average strain-to-failure of 1.4%, 1.3%, 1.2%, 1.1%, 0.9%, 0.8%, 0.6%, 0.3%, 0.2%, 0.1% or less. The average strain-to-failure of the glass substrate 120 may be greater than the average strain-to-failure of the film 110, and in some instances, may be greater than the average strain-to-failure of the crack mitigating layer 130. In some specific embodiments, the crack mitigating layer 130 may have a higher average strain-to-failure than the glass substrate, to minimize any negative mechanical effect of the crack mitigating layer on the glass substrate.

In one or more embodiments, the crack mitigating layer 130 may have a fracture toughness of 1 MPa·m$^{1/2}$ or greater, for example 2 MPa·m$^{1/2}$ or greater, or 5 MPa·m$^{1/2}$ or greater. The crack mitigating layer 130 may also have a fracture toughness in the range from about 1 MPa·m$^{1/2}$ to about 5 MPa·m$^{1/2}$, or from about 2 MPa·m$^{1/2}$ to about 4 MPa·m$^{1/2}$. In one or more specific embodiments, the crack mitigating layer 130 may have a fracture toughness of 6 MPa·m$^{1/2}$, 7 Mpa·m$^{1/2}$, 8 Mpa·m$^{1/2}$, 9 Mpa·m$^{1/2}$, 10 MPa·m$^{1/2}$ or greater. In such embodiments, the crack mitigating layer 130 average strain-to-failure and/or fracture toughness properties prevents the crack from bridging across the interface between the film 110 and the glass substrate 120. In one or more embodiments, this crack mitigation mechanism occurs regardless of where the crack originates (i.e., the film 110 or the glass substrate 120).

The crack mitigating layer 130 may have a refractive index that is greater than the refractive index of the glass substrate 120. In one or more embodiments, the refractive index of the crack mitigating layer 130 may be less than the refractive index of the film 110. In a more specific embodiment, the refractive index of the crack mitigating layer 130 may be between the refractive index of the glass substrate 120 and the film 110. For example, the refractive index of the crack mitigating layer 130 may be in the range from about 1.45 to about 1.95, from about 1.5 to about 1.8, or from about 1.6 to about 1.75. Alternatively, the crack mitigating layer may have a refractive index that is substantially the same as the glass substrate, or a refractive index that is not more than 0.05 index units greater than or less than the glass substrate over a substantial portion of the visible wavelength range (e.g. from 450 to 650 nm).

In one or more embodiments, the crack mitigating layer 130 is able to withstand high temperature processes. Such processes can include vacuum deposition processes such as chemical vapor deposition (e.g., plasma enhanced chemical vapor deposition), physical vapor deposition (e.g., reactive or nonreactive sputtering or laser ablation), thermal or e-beam evaporation and/or atomic layer deposition. In one or more specific embodiments, the crack mitigating layer is able to withstand a vacuum deposition process in which the film 110 and/or other films disposed on the glass substrate 120 are deposited on the crack mitigating layer 130 via vacuum deposition. As used herein, the term "withstand" includes the resistance of the crack mitigating layer 130 to temperatures exceeding 100° C., 200° C., 300° C., 400° C. and potentially even greater temperatures. In some embodiments, the crack mitigating layer 130 may be considered to withstand the vacuum deposition process if the crack mitigating layer 130 experiences a weight loss of 10% or less, 8% or less, 6% or less, 4% or less, 2% or less or 1% or less, after deposition of the film 110 and/or other films on the glass substrate (and on the crack mitigating layer 130). The deposition process (or testing after the deposition process) under which the crack mitigating layer experiences weight loss can include temperatures of about 100° C. or greater, 200° C. or greater, 300° C. or greater, 400° C. or greater; environments that are rich in a specific gas (e.g., oxygen, nitrogen, argon etc.); and/or environments in which deposition may be performed under vacuum ($10^{-6}$ Torr), under atmospheric conditions and/or at pressures therebetween (e.g., 10 mTorr). As will be discussed herein, the material utilized to form the crack mitigating layer 130 may be specifically selected for its high temperature tolerances (i.e., the ability to withstand high temperature processes such as vacuum deposition processes) and/or its environmental tolerances (i.e., the ability to withstand environments rich in a specific gas or at a specific pressure). These tolerances may include high temperature tolerance, high vacuum tolerance, low vacuum outgassing, a high tolerance to plasma or ionized gases, a high tolerance to ozone, a high tolerance to UV, a high tolerance to solvents, or a high tolerance to acids or bases. In some instances, the crack mitigating layer 130 may be selected to pass an outgassing test according to ASTM E595.

In one or more embodiments, the crack mitigating layer 130 prevents degradation of the average flexural strength of the glass substrate 120. In another embodiment, the crack mitigating layer 130 prevents the film 110 from degrading the average flexural strength of the glass substrate 120. The crack mitigating layer 130 may prevent cracks from bridging between the film 110 and the glass substrate 120. The crack mitigating layer 130 of one or more embodiments may increase the average strain-to-failure of the film 110 and thus, prevents degradation of the average flexural strength of the glass substrate 120. In one or more alternative embodiments, the crack mitigating layer 130 increases the average flexural strength of the article 100, when compared to articles that do not include such a crack mitigating layer but include a glass substrate and a film, as described herein.

The crack mitigating layer 130 may prevent degradation of the average strain-to-failure of the glass substrate 120 in some instances, while in other instances, the crack mitigating layer 130 may prevent the film 110 from degrading the average strain-to-failure of the glass substrate 120. In another embodiment, the crack mitigating layer 130 prevents cracks from bridging between the film 110 and the glass substrate 120, thus preventing the film 110 from degrading the average strain-to-failure of the glass substrate 120. In one or more alternative embodiments, the crack mitigating layer 130 increases the average strain-to-failure of the article 100, when this average strain-to-failure is compared to the average strain-to-failure of articles that do not include a crack mitigating layer but include a glass substrate and a film, as described herein.

In one or more embodiments, the crack mitigating layer 130 may have a low-modulus and/or low-hardness. Low modulus materials and low hardness materials substantially overlap as many low modulus materials are also low hardness materials. However, these two properties (i.e., low modulus and low hardness) are distinguished herein because they highlight two different mechanisms or methods by which a crack can be mitigated (i.e., deflected, arrested or blunted) at the interface between the film 110 and the glass substrate 120. The crack mitigating layer 130 may have a modulus so low that the crack mitigating layer 130 is unable to drive or propagate a crack from one of the film 110 and glass substrate 120 to the other of the film 110 and glass substrate 120. Such crack mitigating layers may have a modulus that is about less than about 50 GPa, less than about 30 GPa, less than about 15 GPa or even less than about 5 GPa.

The crack mitigating layer 130 may have a hardness that is less than about 3.0 GPa, less than 2.0 GPa or even less than 1.0 GPa. These modulus and hardness values can be measured using known diamond nano-indentation methods that are commonly used for determining the modulus and hardness of films. Exemplary diamond nano-indentation methods utilize a Berkovich diamond indenter.

In one or more embodiments, the crack mitigating layer 130 may also exhibit a low yield stress, a low shear modulus, plastic or ductile deformation, or other known properties for strain energy release without brittle fracture. In embodiments where the crack mitigating layer exhibits a low yield stress, the yield stress may be less than 500 MPa, less than 100 MPa, or even less than 10 MPa.

In embodiments in which the crack mitigating layer exhibits a low modulus, low yield stress, or plastic and/or ductile deformation behavior, the crack mitigating layer 130 can deform to release strain energy and prevent crack bridging or propagation between the film 110 and glass substrate 120. These ductile crack mitigating layers may also comprise the high strain-to-failure values listed above for the crack mitigating layer.

An exemplary crack mitigating layer 130 may be a polymeric film. Such films may have a low modulus or a low Tg that cannot support high values of stress within the deposited film 110, thus allowing the film 110 to partially relax and lower the tensile stress within, while minimizing the transmission of stress fields into the glass substrate 120.

In one or more embodiments, the crack mitigating layer 130 physically prevents alignment of cracks originating in the film 110 and the glass substrate 120. In other words, a crack present in the film 110 cannot align with a crack present in the glass substrate 120 because the crack mitigating layer 130 physically prevents such alignment. Alternately or additionally, the crack mitigating layer 130 may have an engineered microstructure that provides a tortuous path for crack propagation, providing an alternative path for strain energy release and minimizing or preventing crack bridging between the glass substrate 120 and film 110.

In one or more embodiments, the crack mitigating layer 130 may include: porous oxides, such as $SiO_2$, $Al_2O_3$; $TiO_2$, $ZrO_2$, $Nb_2O_5$, $Ta_2O_5$, $GeO_2$ and similar material(s) known in the art; porous nitrides or carbides, for example $Si_3N_4$, AlN, TiN, TiC; porous semiconductors such as Si or Ge; porous oxynitrides such as $SiO_xN_y$, $AlO_xN_y$, or $SiAl_xO_yN_z$, tough or nanostructured inorganics, for example, zinc oxide, certain Al alloys, Cu alloys, steels, or stabilized tetragonal zirconia; porous or non-porous hybrid organic-inorganic materials, for example, nanocomposites, fiber-reinforced polymers, silsesquioxanes, polysilsesquioxanes, or "ORMOSILs" (organically modified silica or silicate), and/or a variety of porous or non-porous polymeric materials, for example siloxanes, polysiloxanes, polyacrylates, polyacrylics, PI (polyimides), polyamides, PIA (polyamideimides), polycarbonates, polysulfones, PSU or PPSU (polyarylsulfones), fluoropolymers, fluoroelastomers, lactams, polycylic olefins, and similar materials, including, but not limited to PDMS (polydimethylsiloxane), PMMA (poly(methyl methacrylate)), BCB (benzocyclobutene), PEI (polyetherimide), poly(arylene ethers) such as PEEK (poly-ether-ether-ketone), PES (polyetheresulfone) and PAR (polyarylate), PET (polyethylene terephthalate), PEN (polyethylene napthalate=poly(ethylene-2,6-napthalene dicarboxylate), FEP (fluorinated ethylene propylene), PTFE (polytetrafluoroethylene), PFA (perfluoroalkoxy polymer, e.g., trade names Teflon®, Neoflon®) and similar materials. Other suitable materials include modified polycarbonates, some versions of epoxies, cyanate esters, PPS (polyphenylsulfides), phyphenylenes, polypyrrolones, polyquinoxalines, and bismaleimides. In some embodiments, suitable polyacrylates can include poly(butyl acrylate). In some cases it will be desirable to choose the high-temperature polymeric materials such as siloxanes, silsesquioxanes, polyimides, BCB, fluoropolymers, and others listed herein or known in the art because these materials will tolerate a wider range of temperatures for deposition and/or curing of the film 110. Examples of BCB polymers include the Cyclotene™ resins from Dow Chemical. Examples of polyimides and polyimide precursors include Pyralin™ resins from HD Microsystems or electronics grade polyamic acid solution from Sigma Aldrich (cat. no. 431206). The polyimides may include fluorinated or non-fluorinated polyimides such as those disclosed in U.S. Pat. No. 5,325,219 and related references, or other work known in the art such as "Preparation and Properties of a High Temperature, Flexible and Colorless ITO Coated Polyimide Substrate", European Polymer Journal, 43, p. 3368, 2007; "Flexible Organic Electroluminescent Devices Based on Fluorine-Containing Colorless Polyimide Substrates", Advanced Materials, 14, 18, p. 1275, 2002; and "Alignment layer effects on thin liquid crystal cells," Appl. Phys. Lett. 92, 061102, 2008. Examples of silsesquioxanes include Accuglass® Spin-on-Glasses from Honeywell or FOx® Flowable Oxides from Dow Corning.

The thickness of the crack mitigating layer 130 may be in the range of about 0.01 µm to about 10 µm (10 nm to 10,000 nm) or in the range from about 0.04 µm to about 0.5 µm (40 nm to about 500 nm); however in some cases the layer can be much thinner, for example, the crack mitigating layer 130 may be a single-molecule "monolayer" having a thickness of about 0.1 nm to about 2 nm. In one or more embodiments, the thickness of the crack mitigating layer 130 is in the range from about 0.02 µm to about 10 µm, from about 0.03 µm to about 10 µm, from about 0.04 µm to about 10 µm, from about 0.05 µm to about 10 µm, from about 0.06 µm to about 10 µm, from about 0.07 µm to about 10 µm, from about 0.08 µm to about 10 µm, from about 0.09 µm to about 10 µm, from about 0.1 µm to about 10 µm, from about 0.01 µm to about 9 µm, from about 0.01 µm to about 8 µm, from about 0.01 µm to about 7 µm, from about 0.01 µm to about 6 µm, from about 0.01 µm to about 5 µm, from about 0.01 µm to about 4 µm, from about 0.01 µm to about 3 µm, from about 0.01 µm to about 2 µm, from about 0.01 µm to about 1 micron, from about 0.02 µm to about 1 micron, from about 0.03 to about 1 µm, from about 0.04 µm to about 0.5 µm, from about 0.05 µm to about 0.25 µm or from about 0.05 µm to about 0.15 µm.

In one or more embodiments, thicknesses of the glass substrate 120, film 110 and/or crack mitigating layer 130 may be specified in relation to one another. For example, the crack mitigating layer may have a thickness that is less than or equal to about 10 times the thickness of the film. For example, where a film 110 has a thickness of about 85 nm, the crack mitigating layer 130 may have a thickness of about 850 nm or less. In another example, the thickness of the crack mitigating layer 130 may be in the range from about 35 nm to about 80 nm and the film 110 may have a thickness in the range from about 30 nm to about 300 nm. In one variant, the crack mitigating layer may have a thickness that is less than or equal to about 9 times, 8 times, 7 times, 6 times, 5 times, 4 times, 3 times or two times the thickness of the film. In another variant, the thickness of the film and the thickness of the crack mitigating film are each less than about 10 µm, less than about 5 µm, less than about 2 µm, or less than about 1 µm. The ratio of the crack mitigating layer 130 thickness to the film 110 thickness may be, in some embodiments, in the range from about 1:2 to about 1:8, in the range from about 1:3 to about 1:6, in the range from about 1:3 to about 1:5, or in the range from about 1:3 to about 1:4.

One or more embodiments of the article include a crack mitigating layer 130 comprising polyimide. In such embodiments, when the crack mitigating layer 130 is utilized, the film 110 maintains functional properties (e.g., electrical conductivity) and the article 100 retains its average flexural strength. In such embodiments, the film 110 may include one or more transparent conductive oxide layers, such as indium-tin-oxide layers. In addition, the glass substrate 120 may be strengthened, or more specifically, chemically strengthened. In these embodiments, use of polyimide or other high-temperature-tolerant polymers as components of the crack mitigating layer may be preferred because these high-temperature-tolerant polymers can withstand the sometimes harsh vacuum deposition conditions of certain films, an important factor in enabling the desired film properties to be maintained.

Additionally or alternatively, the film 110 comprising indium-tin-oxide and the crack mitigating layer 130 comprising polyimide form a stack, wherein the stack has an overall low optical reflection. For example, the overall reflection of such a stack may be 10% or less, 8% or less, 7% or less, 6.5% or less, 6% or less, 5.5% or less across a visible wavelength range from 450-650 nm, 420-680 nm, or even 400-700 nm. The reflectivity numbers above are quoted including the reflection from one external bare (or uncoated) glass interface, as shown in the optical reflectance simulations of FIGS. 10, 11, and 12, which is approximately 4% reflection from the external uncoated glass interface alone, and for specific embodiment where a polyimide crack mitigating layer 130 and an indium-tin-oxide film 110 are covered by some encapsulation or adhesive layer. Thus, the reflectivity from this film stack structure and film-glass coated interfaces alone (subtracting out the reflectivity of the external, uncoated glass interface) is less than about 5%, 4%, 3%, 2%, or even less than about 1.5% across a visible wavelength range from 450-650 nm, 420-680 nm, or even 400-700 nm, when covered by a typical encapsulant (i.e. an additional film or layer) having an encapsulant refractive index of about 1.45-1.65.

The crack mitigating layer 130 may be disposed between the film 110 and the glass substrate 120 by a variety of methods. The crack mitigating layer 130 can be disposed using vacuum deposition techniques, for example, chemical vapor deposition (e.g., plasma enhanced chemical vapor deposition), physical vapor deposition (e.g., reactive or nonreactive sputtering or laser ablation), thermal, resistive or e-beam evaporation and/or atomic layer deposition. The crack mitigating layer 130 may also be disposed using liquid-based deposition techniques, for example sol-gel coating or polymer coating methods, for example spin, spray, slot draw, slide, wire-wound rod, blade/knife, air knife, curtain, roller, gravure coating among others and other methods known in the art. Porosity can be also be introduced in the crack mitigating layer 130 to lower the overall crack mitigating layer 130 elastic modulus or provide a tortuous path for crack propagation by various known methods such as a slight overpressure of gas in the vacuum chamber, low temperature deposition, use of porogens (materials that create pores or increase porosity) in chemical vapor deposition processes, and plasma energy modification. Porosity can be introduced to liquid-based deposition techniques by use of a pore forming material which is later dissolved or thermally decomposed, phase separation methods, or the casting of a particulate or nanoparticulate film where interstices between particles remain partially void.

Polymeric or organic-inorganic hybrid materials can be employed in the crack mitigating layer 130 where it is desirable for the crack mitigating layer 130 to have ductile properties or to be plastically deformable, with or without porosity. In addition, the crack mitigating layer 130 may include ductile metal films such as Al or Cu.

In some embodiments a useful measure of tendency towards plastic deformation is the elongation at break (expressed as a "%" or a "strain value"). In these embodiments the crack mitigating layer 130 may be ductile or plastically deformable and may include material that exhibits an elongation at break, strain value, greater than about 1%, greater than 2%, greater than 5%, or even greater than 10%. The crack mitigating layer 130 may have a higher elongation to break than the film 110. Exemplary materials for use in crack mitigating layers 130 that are ductile or plastically deformable include a variety of metals and polymers, including organic-inorganic hybrids, materials listed above including, but not limited to, polyimides, PTFE (polytetrafluoroethylene), PES (polyethersulfone), PEI (polyetherimide), PPSU (polyphenylsulfone), PVDF (polyvinylidine difluoride), polyesters, and similar materials known in the art. In instances where a ductile or plastically deformable crack mitigating layer 130 is utilized, the crack mitigating layer 130 may also have a high toughness. For example, the crack mitigating layer 130 may have a fracture toughness of 0.5 $MPa \cdot m^{1/2}$ or greater, or in some cases 5 $MPa \cdot m^{1/2}$ or greater. The crack mitigating layer may also have a high critical strain energy release rate, with values as listed hereinabove.

In one or more embodiments, a crack mitigating layer 130 may have ductile or plastically deformable properties and/or can also be used between the film 110 and the glass substrate 120 to create an engineered adhesion between the film 110 and the glass substrate 120. In one or more specific embodiments, the crack mitigating layer 130 creates a low-adhesion or low toughness layer or interface between the film 110 and the glass substrate 120. In one variant the low-adhesion or low-toughness layer or interface may have a toughness that is less than about 0.5 times the toughness of the glass substrate 120. The goal of the crack mitigating layer 130, when used to modify the adhesion or interfacial toughness between the film 110 and glass substrate 120, is to form an adhesion that is high enough for normal use, but under high stress conditions, the interface between the film 110 and glass substrate 120 fails before cracks can bridge from one of the film 110 or the glass substrate 120 into the other of the film 110 or the glass substrate 120. Stated another way, the film 110 delaminates from the glass substrate 120 under high stress conditions because the adhesion is low enough to energetically favor film delamination or crack deflection along one or more interfaces. In one or more embodiments, when the crack mitigating layer 130 is utilized to create an engineered adhesion, the interface between the film 110 and the glass substrate has a critical strain energy release rate that is less than 0.25 times or less than 0.5 times the critical strain energy release rate of the glass substrate. In such cases, the critical strain energy release rate of the interface can be less than about 0.05 kJ/m$^2$, less than about 0.005 kJ/m$^2$, or even less than about 0.003 kJ/m$^2$, but in some embodiments may be greater than about 0.001 kJ/m$^2$.

In some embodiments the adhesion between the film 110 and the glass substrate 120 is modified by modifying the surface energy of the glass substrate 120. The surface energy of the glass substrate 120 can be modified by disposing a material monolayer, a self-assembled material monolayer, a sub-monolayer (incomplete coverage), an islands-in-the-sea layer where a material layer constitutes the islands and the glass surface the sea, or other very thin atomic or molecular-scale layers on the glass substrate 120. These layers may be chosen to have a lower surface energy than the glass substrate 120, or a lower bonding affinity for either the glass substrate 120 or the film 110. Examples of materials useful in such layers may include the aforementioned nitrides, carbides, hybrid organic-inorganic silanes or silazanes or silsesquioxanes, polymeric or monomeric organics, and similar materials. Specific examples, in addition to those listed previously, include but are not limited to boron nitride, graphene, graphitic carbon, glassy carbon, diamond-like carbon, hexamethyldisilazane (HMDS), trimethlyethoxysilane, fluorosilanes, fluorocarbons, and similar or related materials. The adhesion-modifying materials applied to the glass substrate 120 may have a thickness in the range of 1-10 atomic or molecular layers, or in other cases a thickness in the range of 0.1 to 10 nanometers. However, as described, in some cases the adhesion-modifying layer may serve a dual function as a crack mitigating layer 130, for example having both dual adhesion modifying and plastic deformation properties. In such instances, the thickness can be greater, such as that described above for the crack mitigating layer 130.

In an embodiment, the materials utilized to modify the surface energy of the glass substrate 120 may be disposed in a controlled fashion to achieve tunable or incomplete surface coverage on the glass substrate 120 as a method to tune the adhesion into a desired range. Alternately, wet chemistry methods can also be used, particularly for the organically modified materials. Another method for creating tunable surface coverage of these materials, for example the above mentioned silanes or silazanes, is to deposit a thin film of the material with complete coverage and then treat the film for a short time in the range of 0.5 minutes to 120 minutes at high temperature in the range of 100-600° C. in oxygen or under an oxygen plasma. By controlling the time of heating or plasma treatment, the silanes or silazanes have some of their organic groups removed or converted to $SiO_2$, thus creating an intermediate and tunable surface energy or adhesion level.

An additional or alternative approach for creating engineered adhesion between the film 110 and the glass substrate 120, is to control the deposition conditions of the film 110. For example, using low temperature or low plasma energy during a vapor deposition processes, the bonding strength between the film 110 and the glass substrate 120 can be reduced in a controlled fashion owing to molecular/atomic organic species, molecular/atomic metallic species, or incomplete ionic or incomplete covalent bonding across the interface between the film 110 and glass substrate 120. Such engineered adhesion interfaces may be characterized by a high proportion of hydrogen bonding or Van der Waals bonding, relative to covalent or ionic bonding, at the interface between film 110 and glass substrate 130. In one or more embodiments, such process conditions may be useful with certain films 110 that can be disposed at low temperature or low plasma energy without adversely affecting the functional properties of the film itself.

The optical properties of the article 100 may be adjusted by varying one or more of the properties of the film 110, crack mitigating layer 130 and/or the glass substrate 120. For example, the article 100 may exhibit a total reflectance of 10% or less, 8% or less, 7% or less, 6.9% or less, 6.8% or less, 6.7% or less, 6.6% or less, 6.5% or less, 6.4% or less, 6.3% or less, 6.2% or less, 6.1% or less and/or 6% or less, over the visible wavelength range from about 400 nm to about 700 nm. Ranges may further vary as specified hereinabove, and ranges for the film stack/coated glass interfaces alone are listed hereinabove. In more specific embodiments, the article 100 described herein, may exhibit a lower average reflectance and greater average flexural strength than articles without a crack mitigating layer 130. In one or more alternative embodiments, at least two of optical properties, electrical properties or mechanical properties of the article 100 may be adjusted by varying the thickness(es) of the glass substrate 120, film 110 and/or the crack mitigating layer 130. Additionally or alternatively, the average flexural strength of the article 100 may be adjusted or improved by modifying the thickness(es) of the glass substrate 120, film 110 and/or the crack mitigating layer 130.

The article 100 may include one or more additional films disposed on the glass substrate. In one or more embodiments, the one or more additional films may be disposed on the film 110 or on the opposite major surface from the film. The additional film(s) may be disposed in direct contact with the film 110. In one or more embodiments, the additional film(s) may be positioned between: 1) the glass substrate 120 and the crack mitigating layer 130; or 2) the crack mitigating layer 130 and the film 110. In one or more embodiments, both the crack mitigating layer 130 and the film 110 may be positioned between the glass substrate 120 and the additional film(s). The additional film(s) may include a protective layer, an adhesive layer, a planarizing layer, an anti-splintering layer, an optical bonding layer, a display layer, a polarizing layer, a light-absorbing layer, reflection-modifying interference layers, scratch-resistant layers, barrier layers, passivation layers, hermetic layers, diffusion-blocking layers and combinations thereof, and other layers known in the art to perform these or related functions. Examples of suitable protective or barrier layers include layers containing $SiO_x$, $SiN_y$, $SiO_xN_y$, other similar materials and combinations thereof. Such layers can also be modified to match or complement the optical properties of the film 110, the crack mitigating layer 130 and/or the glass substrate 120. For example, the protective layer may be selected to have a similar refractive index as the crack mitigating layer 130, the film 110 or the glass substrate 120. It will be apparent to those of ordinary skill in the art that multiple additional film(s) with varying refractive indices and/or thicknesses can be inserted for various reasons. The refractive indices, thicknesses and other properties of the additional films (as well as the crack mitigating layer 130 and the film 110) may be further modified and optimized, without departing from the spirit of the disclosure. In other cases, for example, alternate film designs can be employed where the crack mitigating layer 130 may have a higher refractive index than the film. In other cases, the crack mitigating layer 130 may be engineered to have even lower modulus or greater ductility or plasticity than the embodiments and examples disclosed herein.

In one or more embodiments, the articles 100 described may be used in information display devices and/or touch-sensing devices. In one or more alternative embodiments, the article 100 may be part of a laminate structure, for example as a glass-polymer-glass laminated safety glass to be used in automotive or aircraft windows. An exemplary polymer material used as an interlayer in these laminates is PVB (Polyvinyl butyral), and there are many other interlayer materials known in the art that can be used. In addition, there are various options for the structure of the laminated glass, which are not particularly limited. The article 100 may be curved or shaped in the final application, for example as in an automotive windshield, sunroof, or side window. The thickness of the article 100 can vary, for either design or mechanical reasons; for example, the article 100 can be thicker at the edges than at the center of the article. The article 100 may be acid polished or otherwise treated to remove or reduce the effect of surface flaws.

Another aspect of the present disclosure pertains to touch-sensing devices including the articles described herein. In one or more embodiments, the touch sensor device may include a glass substrate 120 (which may be strengthened or not strengthened), a film 110 comprising a transparent conductive oxide and a crack mitigating layer 130. The transparent conductive oxide may include indium-tin-oxide, aluminum-zinc-oxide, fluorinated tin oxide, or others known in the art. In one or more embodiments, the film 110 is discontinuously disposed on the glass substrate 120. In other words, the film 110 may be disposed on discrete regions of the glass substrate 120. The discrete regions with the film form patterned or coated regions (not shown), while the discrete regions without the film form unpatterned or uncoated regions (not shown). In one or more embodiments, the patterned or coated regions and unpatterned or uncoated regions are formed by disposing the film 110 continuously on a surface of the glass substrate 120 and then selectively etching away the film 110 in the discrete regions so that there is no film 110 in those discrete regions. The film 110 may be etched away using an etchant such as HCl or $FeCl_3$ in aqueous solutions, such as the commercially available TE-100 etchant from Transene Co. In one or more embodiments, the crack mitigating layer 130 is not significantly degraded or removed by the etchant. Alternatively, the film 110 may be selectively deposited onto discrete regions of a surface of the glass substrate 120 to form the patterned or coated regions and unpatterned or uncoated regions.

In one or more embodiments, the uncoated regions have a total reflectance that is similar to the total reflectance of the coated regions. In one or more specific embodiments, the unpatterned or uncoated regions have a total reflectance that differs from the total reflectance of the patterned or coated regions by about 5% or less, 4.5% or less, 4% or less, 3.5% or less, 3% or less, 2.5% or less, 2.0% or less, 1.5% or less or even 1% or less across a visible wavelength in the range from about 450 nm to about 650 nm, from about 420 nm to about 680 nm or even from about 400 nm to about 700 nm.

In accordance with another aspect of the present disclosure, articles 100 including both a crack mitigating layer 130 and a film 110, which may include indium-tin-oxide or other transparent conductive oxides, exhibit resistivity that is acceptable for use of such articles in touch sensing devices. In one or more embodiments, the films 110, when present in the articles disclosed herein, exhibit a sheet resistance of about 100 ohm/square or less, 80 ohm/square or less, 50 ohm/square or less, or even 30 ohm/square or less. In such embodiments, the film may have a thickness of about 200 nm or less, 150 nm or less, 100 nm or less, 80 nm or less, 50 nm or less or even 35 nm or less. In one or more specific embodiments, such films, when present in the article, exhibit a resistivity of $10 \times 10^{-4}$ ohm-cm or less, $8 \times 10^{-4}$ ohm-cm or less, $5 \times 10^{-4}$ ohm-cm or less, or even $3 \times 10^{-4}$ ohm-cm or less. Thus, the films 110, when present in the articles 100 disclosed herein can favorably maintain the electrical and optical performance expected of transparent conductive oxide films and other such films used in touch sensor applications, including projected capacitive touch sensor devices.

The disclosure herein can also be applied to articles which have a articles that are not interactive or for display; for example, such articles may be used in a case in which a device has a glass front side that is used for display and can be interactive, and a back side that might be termed "decorative" in a very broad sense, meaning that backside can be "painted" some color, have art work or information about the manufacturer, model and serial number, texturing or other features.

Another aspect of the present disclosure pertains to a method of forming an article 100. In one or more embodiments, such methods include providing a glass substrate 120, disposing a crack mitigating layer 130 on a surface (e.g., one or more of the major surfaces 122, 124 and/or one or more minor surfaces) of the glass substrate 120, disposing a film 110 on the crack mitigating layer 130, such that the crack mitigating layer 130 is disposed between the film 110 and the glass substrate 120. In one or more embodiments, the method includes disposing the film 110 via a vacuum deposition process. In particular embodiments, such vacuum deposition processes may utilize temperatures of at least about 100° C., 200° C., 300° C., 400° C. and all ranges and sub-ranges therebetween.

In one or more specific embodiments, the method includes controlling the thickness(es) of the crack mitigating layer 130 and/or the film 110. Controlling the thickness(es) of the films disclosed herein may be performed by controlling one or more processes for forming the films so that the films are applied having a desired or defined thickness. In an even more specific embodiment, the method includes controlling the thickness(es) of the crack mitigating layer 130 and/or the film 110 to maintain the average flexural strength of the glass substrate 120 and/or the functional properties of the film 110. The method may include disposing an additional film on the glass substrate 120. In one or more embodiments, the method may include disposing the additional film on the glass substrate such that the additional film is disposed between the glass substrate 120 and the crack mitigating layer 130, between the crack mitigating layer 130 and the film 110 or, such that the film 110 is between the crack mitigating layer 130 and the additional film. Alternatively, the method may include disposing the additional film on the opposite major surface of the glass substrate 120 from the surface on which the film is disposed. The additional film may include a protective layer, an adhesive layer, a planarizing layer, an anti-splintering layer, an optical bonding layer, a display layer, a polarizing layer, a light-absorbing layer, reflection-modifying interference layers, scratch-resistant layers, barrier layers, passivation layers, hermetic layers, diffusion-blocking layers, or combinations thereof.

In one or more embodiments, the method includes strengthening the glass substrate 120 before or after disposing the crack mitigating layer 130, film 110 and/or an additional film on the glass substrate. The glass substrate 120 may be strengthened chemically or otherwise. The glass substrate 120 may be strengthened after disposing the crack mitigating layer 130 on the glass substrate 120 but before disposing the film 110 on the glass substrate. The glass substrate 120 may be strengthened after disposing the crack mitigating layer 130 and the film 110 on the glass substrate 120 but before disposing an additional film (if any) on the glass substrate. Where no additional film is utilized, the glass substrate 120 may be strengthened after disposing the crack mitigating layer 130 and the film 110 on the glass substrate.

The following examples represent certain non-limiting embodiments of the disclosure.

EXAMPLES 1A-1J

Examples 1A-1J include articles according to one or more embodiments of the present disclosure or glass substrates of the prior art. Each of Examples 1A-1J utilized commercially available glass substrates of aluminosilicate glass. The glass substrates had a thickness of 0.7 mm. In Examples 1A-1E, the glass substrates were strengthened by ion exchange to provide a surface compressive stress (CS) of about 690 MPa and a compressive depth of layer (DOL) of about 23 μm. The glass substrate of Example 1F was not strengthened by ion exchange. In Examples 1G-1J, the strengthened glass substrates were strengthened by ion exchange to provide a surface compressive stress of about 740 MPa and a compressive depth of layer of about 44 μm. A crack mitigating layer comprising polyimide and/or a film comprising indium-tin-oxide were disposed on the strengthened glass substrates and (non-strengthened) glass substrates as provided below in Table 1. Examples 1A, 1E, 1F, 1G and 1H are indicated as comparative because they did not include a crack mitigating layer.

TABLE 1

Examples 1A-1J.

| Example | Glass Substrate | Surface CS/ Compressive DOL | Crack Mitigating Layer (polyimide) | Film (indium-tin-oxide) |
|---|---|---|---|---|
| 1A (comparative) | Strengthened | 690 MPa/23 μm | none | None |
| 1B | Strengthened | 690 MPa/23 μm | 155 nm | 85 nm |
| 1C | Strengthened | 690 MPa/23 μm | 220 nm | 85 nm |
| 1D | Strengthened | 690 MPa/23 μm | 290 nm | 85 nm |
| 1E (comparative) | Strengthened | 690 MPa/23 μm | None | 85 nm |
| 1F (comparative) | Not strengthened | — | None | 85 nm |
| 1G (comparative) | Strengthened | 740 MPa/44 μm | None | None |
| 1H (comparative) | Strengthened | 740 MPa/44 μm | None | 85 nm |
| 1I | Strengthened | 740 MPa/44 μm | 490 nm | 85 nm |
| 1J | Strengthened | 740 MPa/44 μm | 45 nm | 85 nm |

For the Examples including a strengthened glass substrate (i.e., Examples 1A-1E and 1G-1J), the ion-exchange process was carried out by immersing the glass substrate in a molten potassium nitrate ($KNO_3$) bath that was heated to a temperature in the range from about 350° C. to 450° C. The glass substrates were immersed in the bath for a duration of 3-8 hours to achieve the surface CS and compressive DOL provided in Table 1. After completing the ion exchange process, the glass substrates of Examples 1A-1E and 1G-1J were cleaned in a 1-4% concentration KOH detergent solution, supplied by Semiclean KG, having a temperature of 50-70° C. The detergent solution was ultrasonically agitated at 40-110 KHz. The strengthened glass substrates were then rinsed in DI water, which was also ultrasonically agitated at 40-110 KHz and thereafter dried. Example 1F was also cleaned, rinsed and dried in the same manner as Examples 1A-1E and 1G-1J. In the Examples where a crack mitigating layer was utilized, the following procedure was employed. Prior to disposing the crack mitigating layer, the strengthened glass substrates were then baked for 10 minutes on a hot plate at a temperature of 130° C., and then removed to cool for about 2 minutes.

An aminosilane-based adhesion promoter (supplied by HD Microsystems under the name VM-652) was applied to the strengthened and glass substrates and allowed to remain in the wet state for 20 seconds. The adhesion promoter was spun off the strengthened glass substrates, by spinning the glass substrate and the adhesion promoter applied thereon in a standard vacuum-chuck spin coater at 5000 RPM. After application of the adhesion promoter, a solution of polyimide (supplied by HD Microsystems under the name PI-2555) previously diluted with a solvent thinner comprising N-methyl-2-pyrrolidone (supplied by HD Microsystems under the name T9038/9), using various volume ratios as set out below, was applied to the strengthened glass substrates.

About 1 mL of the polymer solution was applied to each glass sample measuring 50×50 mm square. The strengthened glass substrates with the polyimide solution were then spun at 500 RPM for 3-5 seconds, followed by subsequent rotation of 500-5000 RPM for 30-90 seconds, followed by an optional final rotation step at 5000 RPM for 15 seconds, to obtain the desired thickness and/or concentration of the crack mitigating layer. Example 1B had a polyimide thickness of 155 nm and was prepared using polyimide solution diluted in a 30:70 ratio with the solvent thinner and was spun first at a rotation of 500 RPM for 3 seconds, followed by a subsequent rotation at 4000 RPM for 60 seconds. Example 1C had a polyimide thickness of 220 nm and was prepared using polyimide solution diluted in a 30:70 ratio with the solvent thinner and was spun first at a rotation of 500 RPM for 3 seconds, followed by a subsequent rotation at 1500 RPM for 90 seconds. Example 1D had a polyimide thickness of 290 nm and was prepared using polyimide solution diluted in a 40:60 ratio with the solvent thinner and was spun first at a rotation of 500 RPM for 3 seconds, followed by a subsequent rotation at 1000 RPM for 90 seconds. For examples 1B-1D, the polymer solutions were applied and spin coated on the glass substrates when the solutions were at a temperature of about 15° C., which tends to slow the evaporation of the solvent and yield somewhat thinner films than with a higher temperature solution. Example 1I had a polyimide thickness of 490 nm and was prepared using polyimide solution diluted in a 50:50 ratio with the solvent thinner and was spun first at a rotation of 500 RPM for 5 seconds, followed by a subsequent rotation at 1500 RPM for 45 seconds, followed by a final rotation at 5000 RPM for 15 seconds. Example 1J had a polyimide thickness of 45 nm and was prepared using polyimide solution diluted in a 20:80 ratio with the solvent thinner and was spun first at a rotation of 500 RPM for 5 seconds, followed by a subsequent rotation at 2000 RPM for 30 seconds, followed by a final rotation at 5000 RPM for 15 seconds. For examples 1I and 1J, the polymer solutions were allowed to equilibrate at room temperature (i.e., about 25° C.) for at least one hour before applying and spin coating the solutions on the glass substrates.

Immediately after the spin coating steps as outline above, the Examples containing a crack mitigating layer were then dried and baked on a hot plate at a temperature of 130° C. for 2-3 minutes and then placed in an $N_2$ curing oven (supplied by YES) operating at a pressure of 280 ton and cured at a temperature of 240° C. for 90 minutes. Based on known data and information obtained by testing, the resulting crack mitigating layer had an elastic modulus of about 2.5 GPa to about 10 GPa and an elongation to break of about 10% after curing.

An indium-tin-oxide-containing film was applied to the Examples, as indicated in Table 1. The indium-tin-oxide film was sputtered from an oxide target, using a system supplied by KDF, under the name model 903i. The sputtering target was also supplied by KDF and included $SnO_2$ and $In_2O_3$ present at a ratio of 10:90 by weight. The film was sputtered at a pressure of 10 mTorr in the presence of oxygen flowed at a rate of about 0.5 sccm and argon flowed at a rate of 30 sccm, with DC power supplied at 600 W. After the film was disposed, as indicated in Table 1, the Examples were annealed at a temperature of about 200° C. for 60 minutes in air. For the Examples which did not include a crack-mitigating film (i.e., Examples 1E, 1F, and 1H), the glass substrate was pre-treated, before deposition of the film using a plasma cleaning step in the same KDF system, where the plasma cleaning step employed 15 mTorr pressure, 50 sccm of Argon flow, 5 sccm of oxygen flow, and 400 W of RF power for 1 minute.

Figure 5:
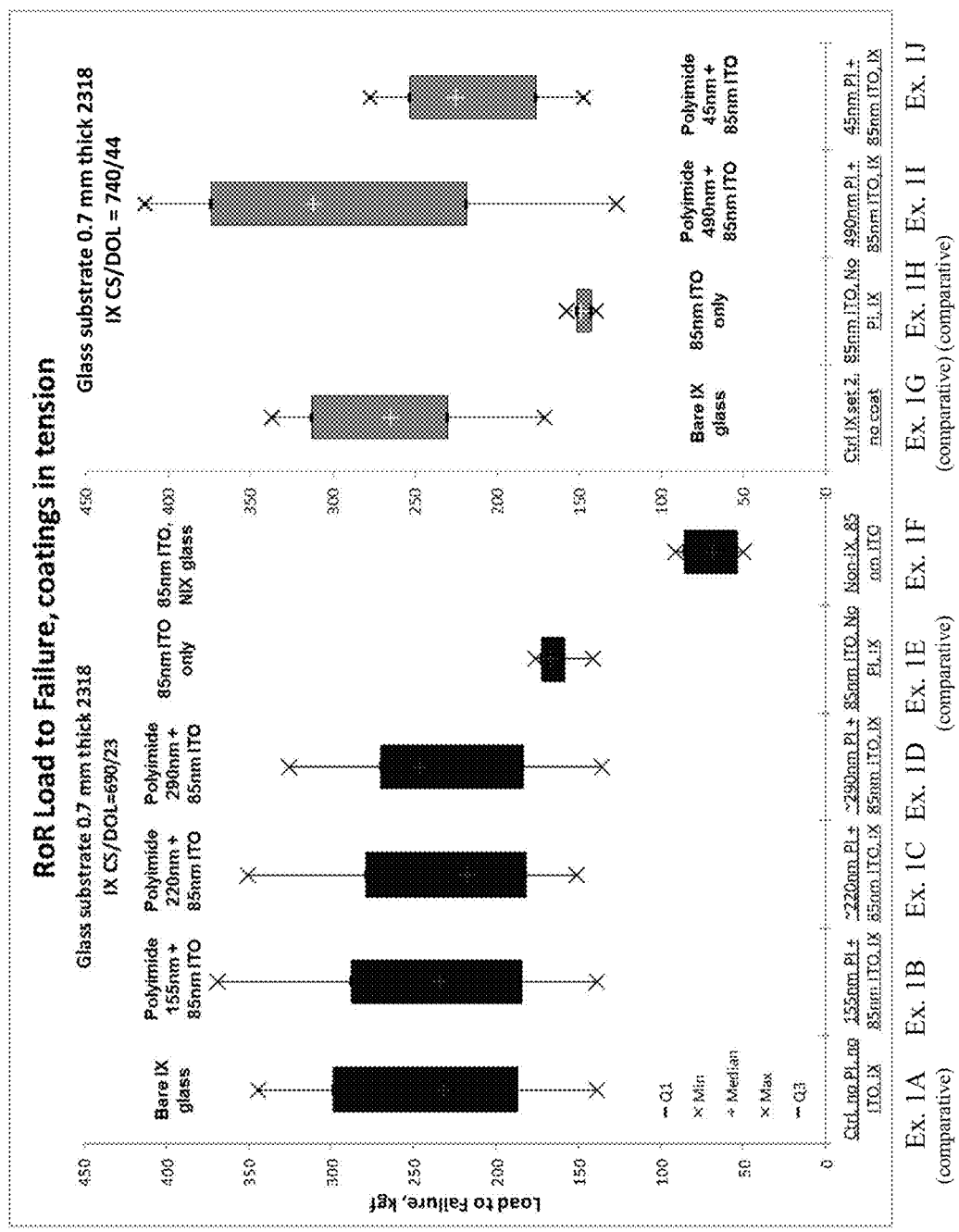
FIG. 5 is a graph presenting ring-on-ring load-to-failure performance of glass substrates or articles according to Examples 1A-1J.

To demonstrate the retention of average flexural strength of the articles and strengthened glass substrates of Examples 1A-1J, the articles and glass substrates were tested using ring-on-ring load to failure testing, as shown in FIG. 5. For ring-on-ring load to failure testing, Examples 1B-1F and 1H-1J (with the film and/or crack mitigating layer) were tested with the side with the film and/or crack mitigating layer in tension. For Examples 1A and 1G (without a film or crack mitigating layer), one side of the strengthened glass substrate was similarly in tension. The ring-on-ring load to failure testing parameters included a contact radius of 1.6 mm, a cross-head speed of 1.2 mm/minute, a load ring diameter of 0.5 inches, and a support ring diameter of 1 inch. Before testing, an adhesive film was placed on both sides of the articles and strengthened glass substrates to contain broken glass shards.

As illustrated in FIG. 5, the addition of a crack mitigating layer including polyimide, having a thickness in the range from about 45 nm to about 490 nm, resulted in articles that retained about the same average flexural strength as glass substrates without a crack mitigating layer or film. Moreover, the articles with a crack mitigating layer exhibited greater average flexural strength than the strengthened and non-strengthened glass substrates with only a film. For comparison, the strengthened and non-strengthened glass substrates with only a film disposed thereon (i.e., Examples 1E, 1F and 1H) exhibited a substantial reduction in the average flexural strength.

EXAMPLES 2A-2D

Each of Examples 2A-2D utilized glass substrates that included a composition of 61 mol %≤$SiO_2$≤75 mol %; 7 mol %≤$Al_2O_3$≤15 mol %; 0 mol %≤$B_2O_3$≤12 mol %; 9 mol %≤$Na_2O$≤21 mol %; 0 mol %≤$K_2O$≤4 mol %; 0 mol %≤MgO≤7 mol %; 0 mol %≤CaO≤3 mol %, and 0 mol %≤$SnO2$≤1 mol %. The glass substrates had a thickness of 0.7 mm and were strengthened by ion exchange and prepared for combination with a crack mitigating layer and/or film, using the same processes as described with reference to Examples 1A-1J. The strengthened glass substrates of Examples 2A-2D had a surface compressive stress (CS) of about 776 MPa and a compressive depth of layer (DOL) of about 41.4 μm. A crack mitigating layer comprising polyimide and a film comprising indium-tin-oxide were disposed on the strengthened glass substrates as provided below in Table 2, using the methods described with reference to Examples 1A-1J to provide the articles of Examples 2A-2D. An adhesion promoter was utilized in the same manner as Examples 1B-1D, 1I, and 1J. Example 2A had a polyimide thickness of 250 nm and was prepared using polyimide solution diluted in a 30:70 volume ratio with the solvent thinner and was spun first at a rotation of 500 RPM for 3 seconds, followed by a subsequent rotation at 4000 RPM for 60 seconds. Example 2B had a polyimide thickness of 90 nm and was prepared using polyimide solution diluted in a 20:80 volume ratio with the solvent thinner and was spun first at a rotation of 500 RPM for 3 seconds, followed by a subsequent rotation at 4000 RPM for 60 seconds. For examples 2A and 2B, the polymer solutions were allowed to equilibrate at room temperature (i.e., about 25 C) for at least one hour before applying and spin coating the solutions on the glass substrates. Drying, baking and curing for these polyimide-coated samples was carried out in the same manner as examples 1B-1D, 1I, and 1J. Examples 2C and 2D are indicated as comparative because they did not include a crack mitigating layer.

TABLE 2

Examples 2A-2D.

| Example | Crack mitigating layer (polyimide) | Film (indium-tin-oxide) |
|---|---|---|
| 2A | 250 nm | 85 nm |
| 2B | 90 nm | 85 nm |
| 2C (comparative) | None | 85 nm |
| 2D (comparative) | None | None |

For ball drop height-to-failure testing, the articles of Examples 2A-2C (with the film and/or crack mitigating layer) were tested with the side with the film and/or crack mitigating layer in tension. For Example 2D, without a film or crack mitigating layer, one side of the strengthened glass substrate was similarly in tension. A steel ball having a weight of 128 g and diameter of 31.75 mm was utilized. The articles and the strengthened glass substrate each had a size of 50 mm×50 mm and were supported at each edge. Before testing, an adhesive film was placed on both sides of the articles and the strengthened glass substrate to contain broken glass shards.

Figure 6:
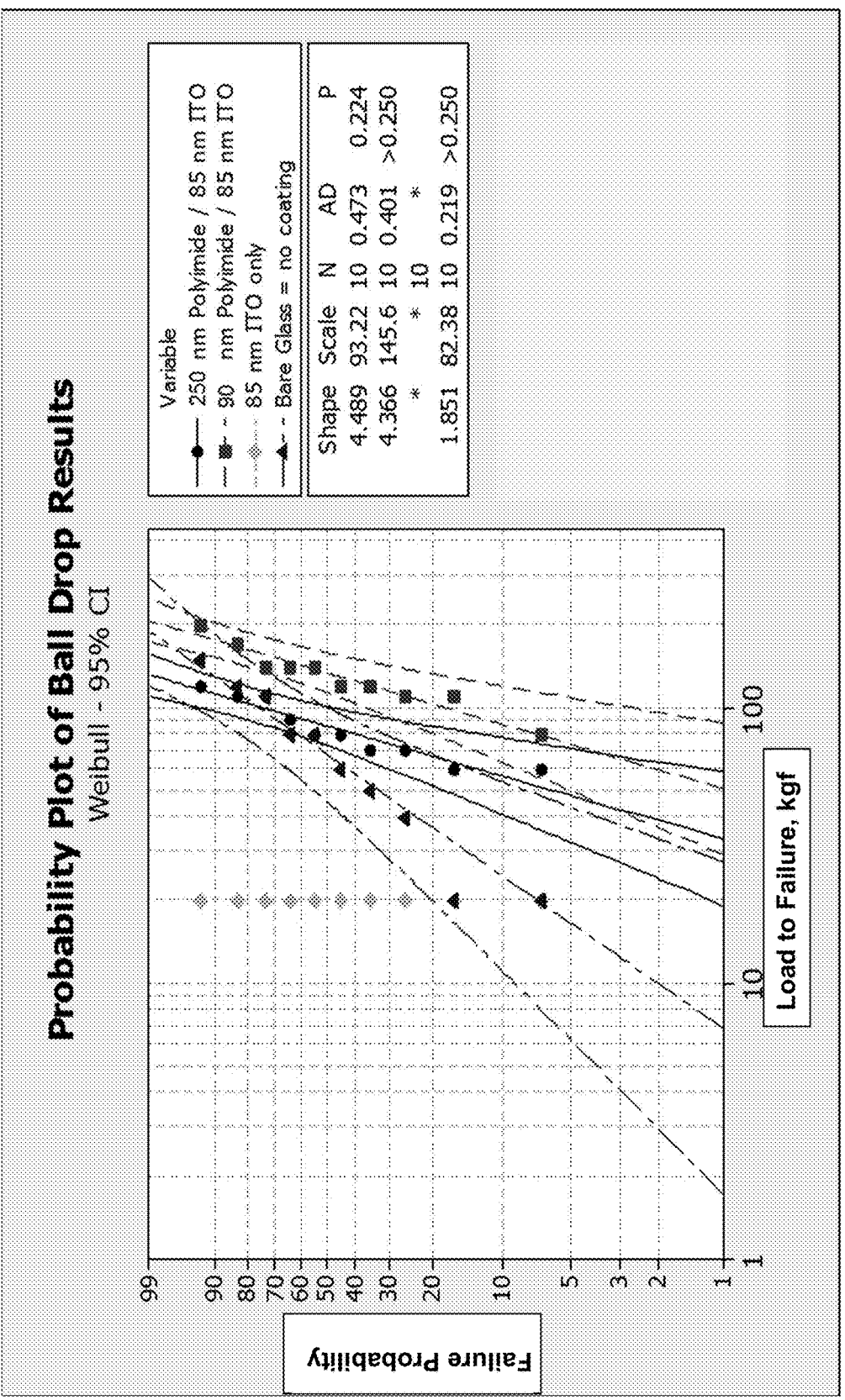
FIG. 6 is a probability plot of ball drop performance of glass substrates or articles according to Examples 2A-2D.

As illustrated in FIG. 6, the articles of Examples 2A and 2B exhibited the same or similar average flexural strength using ball-drop height to failure testing as the strengthened glass substrate of Example 2D, indicating that the articles including a crack mitigating layer retained their respective average flexural strength, while the articles with only a film (and no crack mitigating layer) (i.e., Example 2C) exhibited a significant reduction in or lower level average flexural strength.

EXAMPLES 3A-3C

Figure 7:
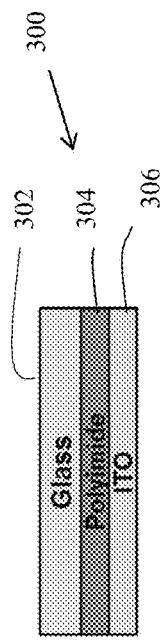
FIG. 7 is an illustration of an article according to Example 3A.
Figure 8:
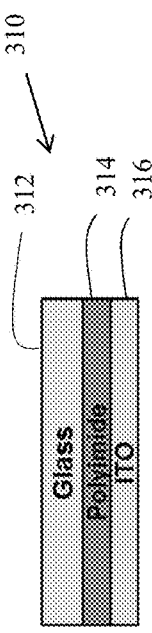
FIG. 8 is an illustration of an article according to Example 3B.
Figure 9:
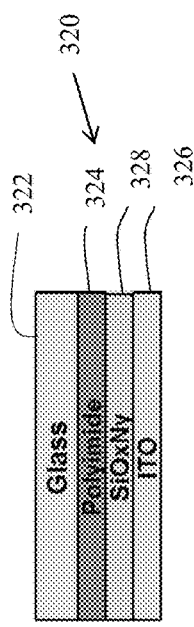
FIG. 9 is an illustration of an article according to Example 3C.
Figure 10:
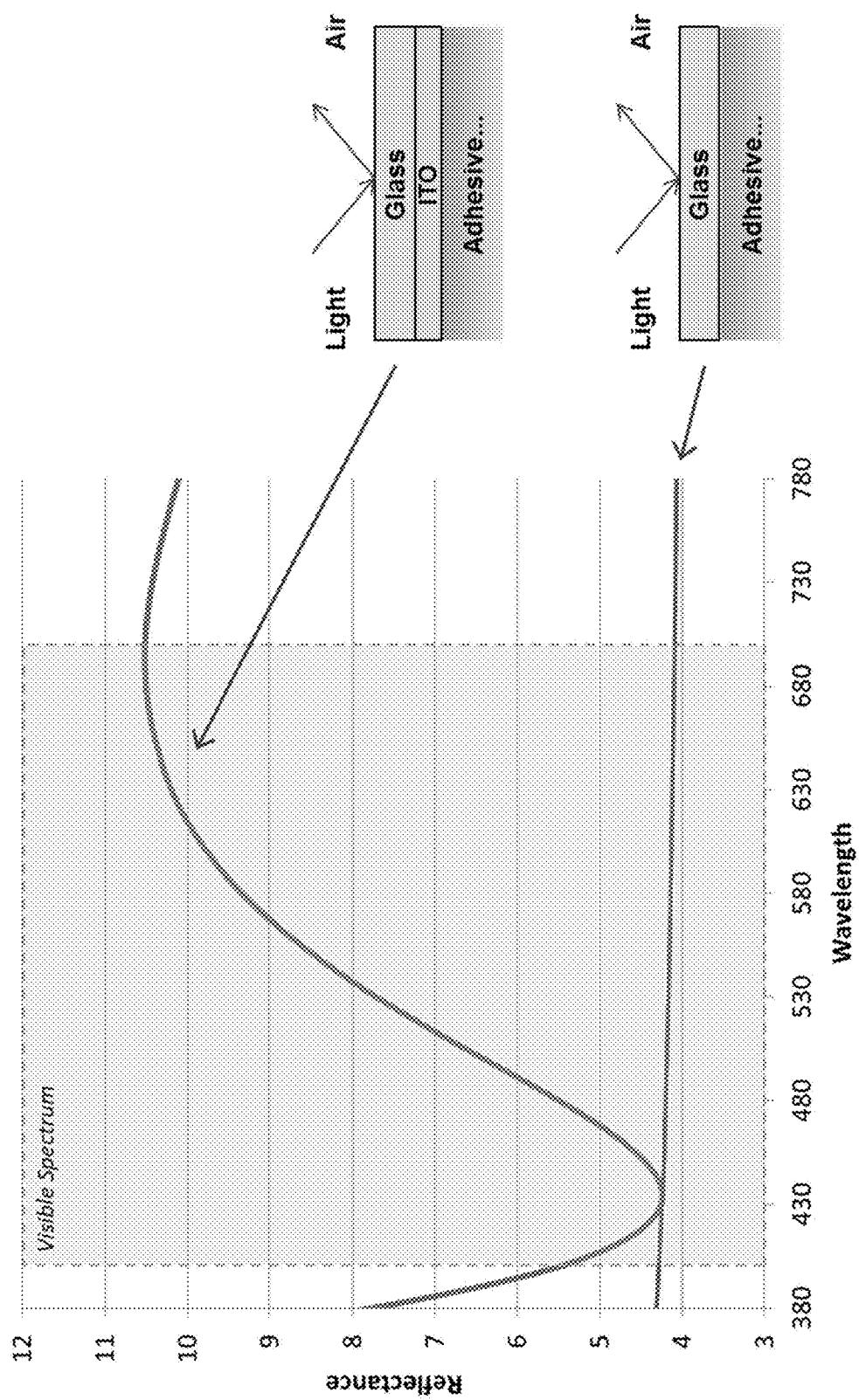
FIG. 10 is a modeled optical reflectance spectrum according to Comparative Examples 4A and 4B.
Figure 11:
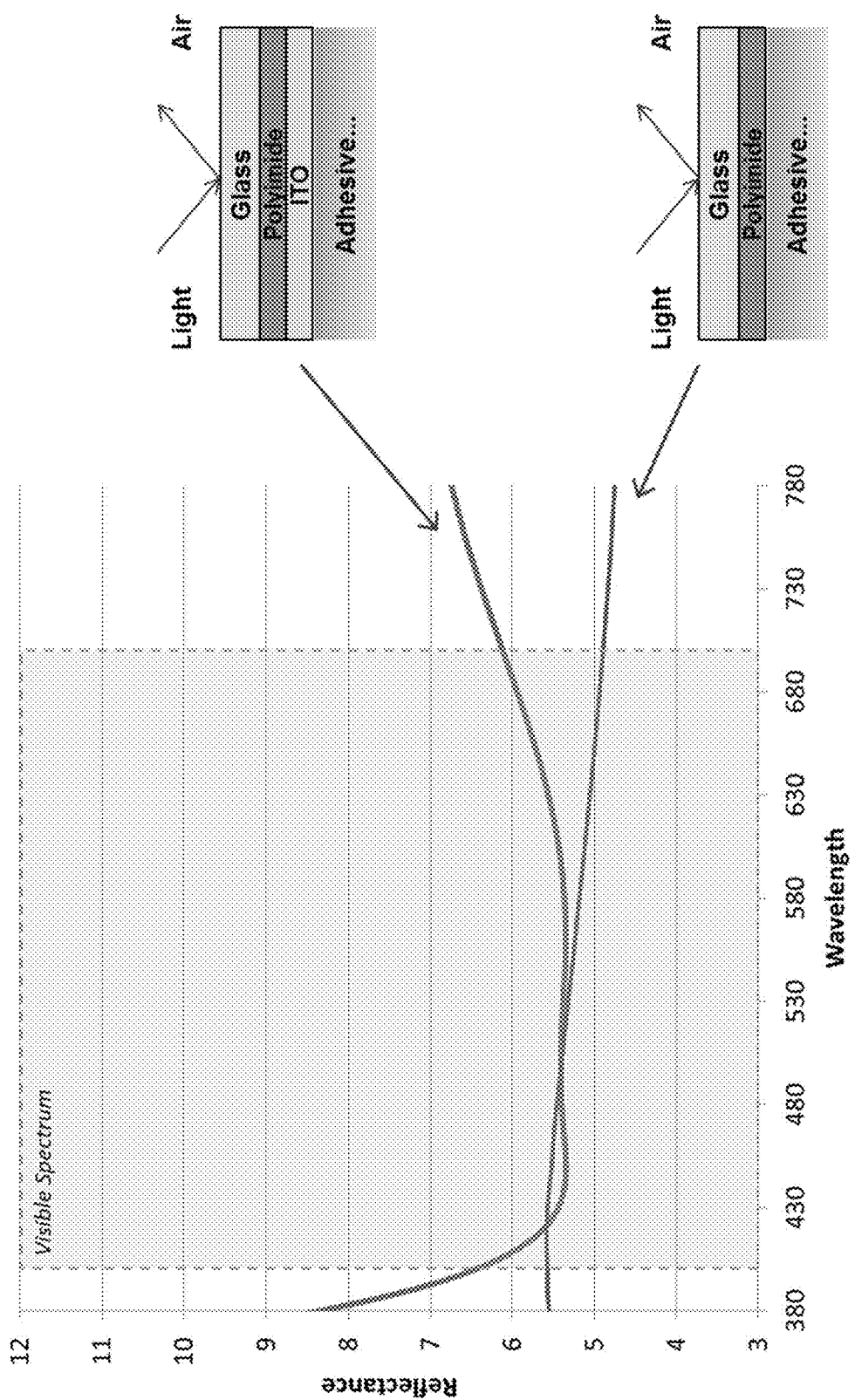
FIG. 11 is a modeled optical reflectance spectrum according to Example 4C and Example 4D.
Figure 12:
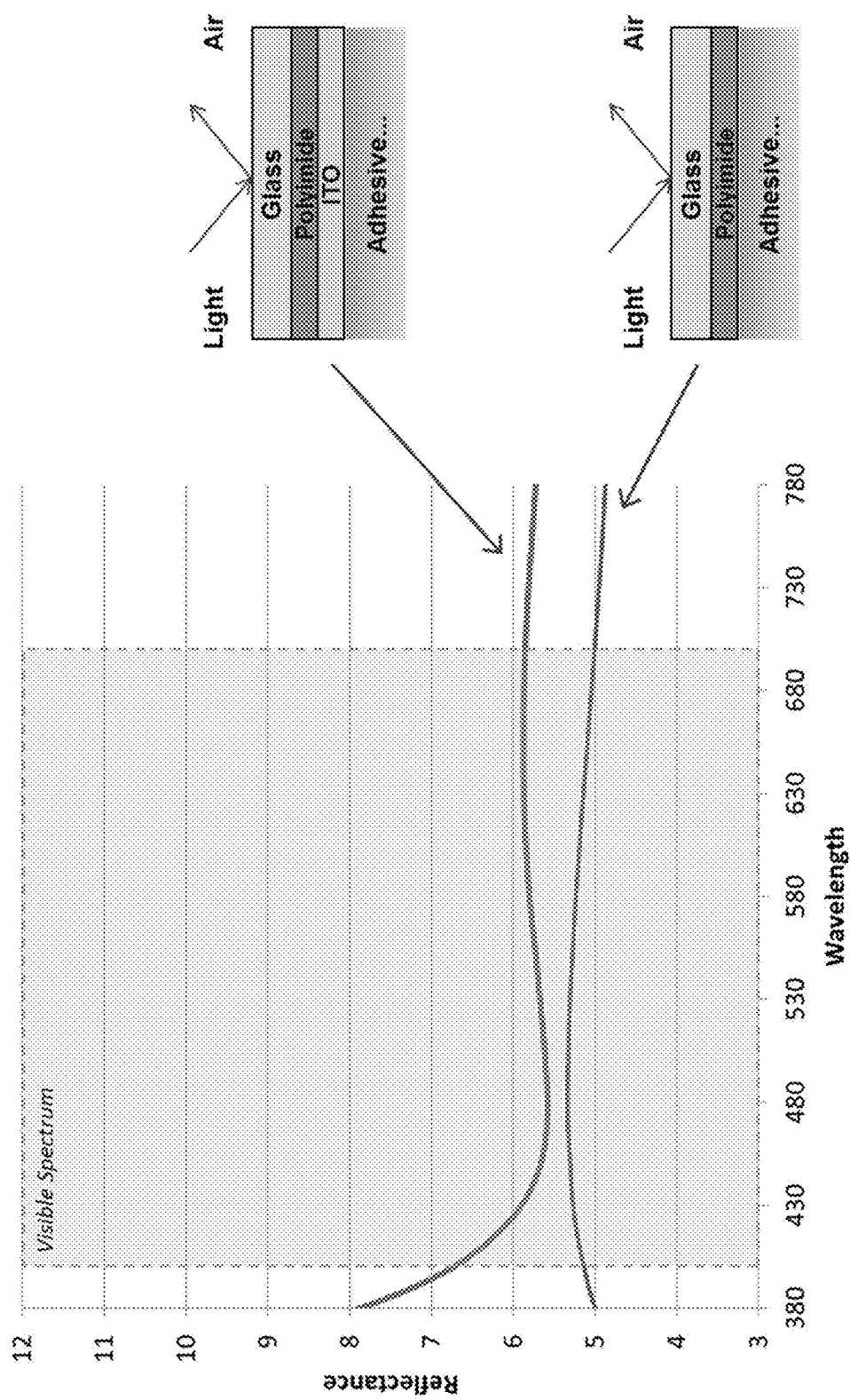
FIG. 12 is a modeled optical reflectance spectrum according to Example 4E and Comparative Example 4F.

Examples 3A-3C are prophetic examples that are illustrated in FIGS. 7-9, with related modeled optical reflectance data shown in FIGS. 10-12. Examples 3A and 3B correlate to Examples 4C and 4E, respectively, which are discussed below. Example 3A-3C include articles 300, 310, 320 each including a glass substrate 302, 312, 322, a crack mitigating layer 304, 314, 324 including polyimide disposed on the glass substrate 302, 312, 322 and a film 306, 316, 326 including indium-tin-oxide disposed on the glass substrate 302, 312, 322 such that the crack mitigating layer is between the glass substrate and the film. In each of Examples 3A-3C, the glass substrates have a thickness in the range from about 0.2 mm to about 2.0 mm. Example 3A includes a crack mitigating layer 304 having a thickness of 74 nm and a film 306 having a thickness of 115 nm. Example 3B includes a crack mitigating layer 314 having a thickness of 85 nm and a film 316 having a thickness of 23 nm. Example 3C includes a crack mitigating layer 324 having a thickness of 64 nm and a film 326 having a thickness of 115 nm. Example 3C includes an additional film 328 including $SiO_xN_y$, which functions as a protective layer, disposed between the crack mitigating layer 324 and the film 326. The additional film 328 has a thickness of 10 nm. In Examples 3A-3C, the glass substrates 302, 312, 322 have a refractive index in the range from about 1.45-1.55, the crack mitigating layers 304, 314, 324 have a refractive index in the range from about 1.6-1.75 and the films 306, 316, 326 have a refractive index in the range from about 1.8-2.2. In Example 3C, the additional film 328 including SiOxNy has a refractive index similar to the refractive index of the crack mitigating layer 324. Each of Examples 3A-3C may include a second additional film (illustrated in FIGS. 10, 11 and 12) that may include an adhesive, which will be more fully described in Modeled Example 4.

In each of the articles 300, 310, 320, the thicknesses of the crack mitigating layer and the film were optimized to simultaneously achieve good optical properties and good mechanical properties. The foregoing examples illustrate that the thickness range of crack mitigating layers and films used in the articles 300, 310, and 320 are effective to retain high average flexural strength for the article, while Modeled Examples 4C and 4E (described below) illustrate that the articles 300, 310, and 320 simultaneously achieve low optical reflectance. Optimization may be achieved by controlling or adjusting one or more process parameters discussed with reference to Examples 1A-1J.

MODELED EXAMPLE 4

Examples 4C and 4E and Comparative Examples 4A, 4B, 4D and 4F were optically modeled using the following information in Table 3. Examples 4C and 4E correlate to Examples 3A and 3B.

TABLE 3

Refractive index (n, k) values versus wavelength (WL) used in the optical modeling designs, which are illustrated by FIGS. 10-12.

| Crack Mitigating Layer | | | Film | | | Glass Substrate | | | Additional Film | | |
|---|---|---|---|---|---|---|---|---|---|---|---|
| WL | n | k | WL | n | k | WL | n | k | WL | n | k |
| 350 | 1.781 | 0.000 | 350 | 2.28 | 0.03 | 300 | 1.532 | 0.000 | 250 | 1.578 | 0.000 |
| 400 | 1.742 | 0.000 | 400 | 2.2 | 0.005 | 450 | 1.517 | 0.000 | 300 | 1.553 | 0.000 |
| 450 | 1.719 | 0.000 | 450 | 2.15 | 0.003 | 550 | 1.512 | 0.000 | 350 | 1.539 | 0.000 |
| 500 | 1.703 | 0.000 | 500 | 2.11 | 0.003 | 700 | 1.507 | 0.000 | 400 | 1.531 | 0.000 |
| 550 | 1.693 | 0.000 | 550 | 2.07 | 0.003 | 1200 | 1.497 | 0.000 | 450 | 1.525 | 0.000 |
| 600 | 1.686 | 0.000 | 600 | 2.04 | 0.003 | | | 0.000 | 500 | 1.521 | 0.000 |
| 650 | 1.680 | 0.000 | 650 | 2.015 | 0.005 | | | | 550 | 1.519 | 0.000 |
| 700 | 1.676 | 0.000 | 700 | 1.995 | 0.007 | | | | 600 | 1.516 | 0.000 |
| 750 | 1.673 | 0.000 | 750 | 1.975 | 0.01 | | | | 650 | 1.515 | 0.000 |
| 850 | 1.670 | 0.000 | 850 | 1.94 | 0.02 | | | | 700 | 1.513 | 0.000 |
| 950 | 1.668 | 0.000 | 950 | 1.9 | 0.03 | | | | 750 | 1.512 | 0.000 |
| | | | 1150 | 1.84 | 0.05 | | | | 800 | 1.511 | 0.000 |
| | | | | | | | | | 850 | 1.510 | 0.000 |
| | | | | | | | | | 900 | 1.509 | 0.000 |

TABLE 3-continued

Refractive index (n, k) values versus wavelength (WL) used in the optical modeling designs, which are illustrated by FIGS. 10-12.

| Crack Mitigating Layer | | | Film | | | Glass Substrate | | | Additional Film | | |
|---|---|---|---|---|---|---|---|---|---|---|---|
| WL | n | k | WL | n | k | WL | n | k | WL | n | k |
| | | | | | | | | | 950 | 1.508 | 0.000 |
| | | | | | | | | | 1000 | 1.508 | 0.000 |

The articles of Comparative Examples 4A and 4B were modeled using a glass substrate having a thickness of 1.0 mm and are illustrated in FIG. 10. In modeled Comparative Example 4A, a film having a thickness of 100 nm is disposed on the glass substrate and an additional film disposed on the film, such that the film is disposed between the glass substrate and the additional film, as illustrated in FIG. 10. In Comparative Example 4B, the model included the additional film being disposed on the glass substrate without an intervening film, as also illustrated in FIG. 10. The additional film of Examples 4A and 4B includes an adhesive having refractive index of about 1.52. In the optical model, the additional film/adhesive layer was treated as being "very thick", meaning it represents the exit ambient medium in the optical model, where air is the input ambient medium. This represents a practical case where reflectance from the distant back surface of the adhesive are not included in the model, because this back surface of the adhesive layer is laminated to additional light-absorbing structures such as polarizing layers, display layers, and device layers that absorb or scatter substantially all of the light that transmits into the adhesive layer. The adhesive represents one or more of a protective layer, a planarizing layer, an anti-splinter layer, or an optical bonding layer and other layers disclosed herein with reference to the additional film. As illustrated in FIG. 10, the presence of a high refractive index film, such as indium-tin-oxide, without a properly designed layer structure or crack mitigating layer, typically causes a significant increase in reflectance in the article, over the visible spectrum.

The articles of Example 4C and Example 4D were modeled using a glass substrate having a thickness of 1.0 mm and are illustrated in FIG. 11. In modeled Example 4C, a crack mitigating layer having a thickness of 74 nm and including polyimide is disposed on a surface of the glass substrate, a film comprising indium-tin-oxide and having a thickness of 115 nm is disposed on the crack mitigating layer and an additional film is disposed on the film. As illustrated in FIG. 11, the crack mitigating layer is disposed between the glass substrate and the film, and the film is disposed between the crack mitigating layer and the additional film. In Example 4D, the modeled article is identical to the modeled article of Example 4C except no film is included, as illustrated in FIG. 11. The additional film of Example 4C and Example 4D includes an adhesive having refractive index of about 1.52. The adhesive is also characterized as being "very thick". The adhesive represents one or more of a protective layer, a planarizing layer, an anti-splinter layer, or an optical bonding layer and other layers disclosed herein with reference to the additional film. Such layers may be commonly used in touch screen devices. As illustrated in FIG. 11, the reflectance of an article with and without a film is similar over a majority of the visible spectrum. Accordingly, when compared to Comparative Example 4A, which showed the presence of a film significantly increasing the reflectance of an article without a crack mitigating layer, the crack mitigating layer abates any increase or variation of reflectance otherwise caused by the presence of the film. In addition, the article including a glass substrate, a film and a crack mitigating layer exhibits a total reflectance that is substantially similar to, that is, within 5%, 4.5%, 4%, 3.5%, 3%, 2.5%, 2%, 1.5% or even 1% of the reflectance of the same article without the film (which may still include the crack-mitigating layer), across the visible wavelength range such as from about 450 to about 650 nm, from about 420 nm to about 680 nm or even from about 400 nm to about 700 nm.

The total reflectance illustrated in FIG. 11 for both of the articles of Examples 4C and 4D (i.e., an article with and an article without a film) can be used to demonstrate the contrast between patterned or coated regions (i.e., regions with a film comprising a transparent conductive oxide) and non-patterned or uncoated regions (i.e., regions without a film) in a touch sensor. The touch sensor pattern simulated by Examples 4C and 4D (using the refractive index values provided in Table 3) is largely "invisible" due to the less than about 1.5% change in absolute reflectance level between the patterned or coated region (containing the film) and the unpatterned or uncoated region (containing no film) in a wavelength range from 450-650 nm. The articles of Examples 4C and 4D also have a low absolute reflectance level, with total reflectance less than about 6% over this same wavelength range. About 4% of the total reflectance comes from the front (uncoated) glass interface with air and less than 2% of the total reflectance comes from the coated side of the glass substrate (i.e., the crack mitigating layer, film and adhesive interfaces).

The articles of Example 4E and Comparative Example 4F were modeled in the same manner as Example 4C and Comparative Example 4D, respectively; however the crack mitigating layer (comprising polyimide) had a thickness of 85 nm and the film (comprising indium-tin-oxide) had a thickness of 23 nm. Example 4E included a glass substrate, a crack mitigating layer disposed on the glass substrate, a film disposed on the crack mitigating layer and an additional film disposed on the film. Comparative Example 4F is identical to Example 4E except it did not include the film. As illustrated in FIG. 12, the total reflectance of a glass-film substrate with and without a film is similar over a majority of the visible spectrum. Accordingly, when compared to Comparative Example 4A, which showed the presence of a film significantly increasing the total reflectance of the article without a crack mitigating layer, the presence of a crack mitigating layer abates any increase or variation of reflectance otherwise caused by the presence of a film. In other words, an article including a glass substrate, a film and a crack mitigating layer exhibits a total reflectance that is substantially similar to, that is, within 5%, 4.5%, 4%, 3.5%, 3%, 2.5%, 2%, 1.5%, or even 1% of the same article without a film.

Based on Example 3 and modeled Example 4, the articles disclosed herein may have a low absolute reflectance and a small change in reflectance (e.g. <1.5%) between regions containing a film and regions not containing a film, rendering a patterned touch sensor largely "invisible", as shown in FIGS. 11 and 12.

Refractive index values for the films and glass substrates used in the optical modeling of Example 4 were derived from experimental films, optical reflectometry, and estimates known in the literature. It will be apparent to those of ordinary skill in the art that these refractive index values can be modified based on material and process choices, requiring a complementary modification to the optimal film thicknesses specified here. In addition, it will be apparent to those of ordinary skill in the art that small modifications of the index values in Table 4 can be achieved through material and process changes, without departing from the spirit of the disclosure. Likewise, small changes in the film and substrate thicknesses and design can be utilized without departing from the spirit of the disclosure. Further, the crack mitigating layers in Example 3 and modeled Example 4 can be chosen to comprise additional materials having similar refractive indices, and in some cases may not include polyimide. For example, the crack mitigating layers in Examples 3 and 4 may comprise nanoporous inorganic layers, alternative polymer materials, or other materials mentioned elsewhere herein.

While the disclosure has been described with respect to a limited number of embodiments for the purpose of illustration, those skilled in the art, having benefit of this disclosure, will appreciate that other embodiments can be devised which do not depart from the scope of the disclosure as disclosed herein. Accordingly, various modifications, adaptations and alternatives may occur to one skilled in the art without departing from the spirit and scope of the present disclosure.

We claim:

1. An article comprising:
a glass substrate having opposing major surfaces having a first average strain-to-failure of 0.5% or greater and a thickness from about 600 μm to about 5 mm, the substrate being chemically strengthened and having a surface compressive stress of at least 500 MPa and a compressive depth of layer 15 μm or greater;
a crack mitigating layer disposed on and directly in contact with the first major surface of the substrate, wherein the crack mitigating layer consists of a polyimide film having a thickness from about 0.04 μm to about 0.5 μm; and
a second film disposed on and directly in contact with the crack mitigating layer having a thickness from about 0.01 μm to about 0.5 μm having a second average strain-to-failure that is less than the first average strain-to-failure and having at least one of a modulus of at least 25 GPa and a hardness of at least 1.75 GPa,
wherein the crack mitigating layer prevents cracks originating in one of the second film or the glass substrate from bridging to the other of the second film or the glass substrate, and
further wherein the second film is exposed.

2. The article of claim 1, wherein the second film comprises functional properties selected from one or more of optical properties, electrical properties and mechanical properties, and wherein the second film retains substantially the same functional properties when the crack mitigating layer is disposed between the glass substrate and the second film.

3. The article of claim 2, wherein the second film comprises one or more layers selected from transparent conductive oxide layers, IR reflecting layers, UV reflecting layers, conducting layers, semiconducting layers, electronics layers, thin film transistor layers, EMI shielding layers, anti-reflection layers, anti-glare layers, dirt-resistant layers, self-cleaning layers, scratch-resistant layers, barrier layers, passivation layers, hermetic layers, diffusion-blocking layers, and fingerprint-resistant layers.

4. The article of claim 1, wherein the crack mitigating layer exhibits a first critical strain energy release rate ($G_{IC}=K_{IC}^2/E$) and the second film exhibits a second critical strain energy release rate ($G_{IC}=K_{IC}^2/E$) that is less than the first critical strain energy release rate.

5. The article of claim 4, wherein the first critical strain energy release rate ($G_{IC}=K_{IC}^2/E$) is about 0.1 kJ/m$^2$ or greater, and wherein the second critical strain energy release rate ($G_{IC}=K_{IC}^2/E$) is less than about 0.1 kJ/m$^2$.

6. The article of claim 1, wherein the crack mitigating layer has a third average strain-to-failure, and wherein the second average strain-to-failure is less than the first average strain-to-failure and the third average strain-to-failure.

7. The article of claim 6, wherein the crack mitigating layer has a yield stress of less than about 500 MPa.

8. The article of claim 1, wherein the crack mitigating layer has an elastic modulus of about 50 GPa or less.

9. The article of claim 8, wherein the second film has an elastic modulus of about 25 GPa or more.

10. The article of claim 9, wherein the second film has a hardness of about 2 GPa or more.

11. The article of claim 1, wherein the glass substrate has an average flexural strength that is maintained when the crack mitigating layer is disposed on the first major surface and the film is disposed on the crack mitigating layer.

12. The article of claim 1, wherein the glass substrate has a first refractive index, the crack mitigating layer has a second refractive index greater than the first refractive index, and the film has a third refractive index greater than the second refractive index.

13. The article of claim 1, wherein the article has a total reflectivity of 10.0% or less over the visible wavelength range from about 450 nm to about 650 nm.

14. An article, comprising:
a glass substrate having opposing major surfaces having a first average strain-to-failure of 0.5% or greater and a thickness from about 600 μm to about 5 μm, the substrate being chemically strengthened and having a surface compressive stress of at least 500 MPa and a compressive depth of layer 15 μm or greater;
a crack mitigating layer, wherein the crack mitigating layer consists of an aminosilane-based adhesion promoter disposed on and directly in contact with the first major surface of the substrate and a polyimide film having a thickness from about 0.04 μm to about 0.5 μm disposed directly on and in contact with the aminosilane-based adhesion promoter; and
a second film disposed on and directly in contact with the crack mitigating layer having a thickness from about 0.01 μm to about 0.5 μm, having a second average strain-to-failure that is less than the first average strain-to-failure and having at least one of a modulus of at least 25 GPa and a hardness of at least 1.75 GPa, wherein the crack mitigating layer prevents cracks originating in one of the second film or the glass substrate from bridging to the other of the film or the glass substrate,
wherein the second film comprises indium-tin-oxide, and
further wherein the second film is exposed.

* * * * *

UNITED STATES PATENT AND TRADEMARK OFFICE
CERTIFICATE OF CORRECTION

PATENT NO. : 10,487,009 B2
APPLICATION NO. : 14/052055
DATED : November 26, 2019
INVENTOR(S) : Heather Bossard Decker et al.

It is certified that error appears in the above-identified patent and that said Letters Patent is hereby corrected as shown below:

On page 2, in Column 2, Item (56), Other Publications, Line 40, delete "JOUNRAL" and insert -- JOURNAL --, therefor.

On page 2, in Column 2, Item (56), Other Publications, Line 55, delete "JOUNRAL" and insert -- JOURNAL --, therefor.

Signed and Sealed this
Fourth Day of February, 2020

Andrei Iancu
*Director of the United States Patent and Trademark Office*